United States Patent [19]

Yamada et al.

[11] Patent Number: 5,526,332
[45] Date of Patent: Jun. 11, 1996

[54] REFERENCE CLOCK GENERATOR FOR SAMPLED SERVO TYPE DISK UNIT AND DISK UNIT

[75] Inventors: Shin-iti Yamada, Katano; Mitsurou Moriya, Ikoma; Hiroyuki Yamaguchi; Toshiyuki Kinou, both of Hirakata, all of Japan

[73] Assignee: Matsushita Electric Industrial Co., Ltd., Osaka, Japan

[21] Appl. No.: 263,783

[22] Filed: Jun. 22, 1994

[30] Foreign Application Priority Data

Jun. 22, 1993 [JP] Japan ...................... 5-150061
Nov. 16, 1993 [JP] Japan ...................... 5-286569

[51] Int. Cl.$^6$ ........................................... G06F 1/04
[52] U.S. Cl. ..................... 369/48; 369/124; 360/51
[58] Field of Search ..................... 369/47, 59, 48, 369/54, 124, 32; 360/51, 49, 45, 40

[56] References Cited

U.S. PATENT DOCUMENTS

| | | | |
|---|---|---|---|
| 4,872,155 | 10/1989 | Yokogawa | 369/59 |
| 4,929,917 | 5/1990 | Yokogawa | 369/47 |
| 4,982,110 | 1/1991 | Yokogawa | 369/48 |
| 5,065,384 | 11/1991 | Yokogawa | 369/59 |
| 5,172,357 | 12/1992 | Taguchi | 369/48 |
| 5,224,086 | 6/1993 | Wachi | 369/47 |
| 5,327,300 | 7/1994 | Satomura | 369/47 |
| 5,377,178 | 12/1994 | Saito et al. | 369/124 |

FOREIGN PATENT DOCUMENTS

| | | |
|---|---|---|
| 61-71475 | 4/1986 | Japan . |
| 62-257676 | 11/1987 | Japan . |
| 63-37873 | 2/1988 | Japan . |
| 2-54482 | 2/1990 | Japan . |
| 3-235270 | 10/1991 | Japan . |

Primary Examiner—Georgia Y. Epps
Assistant Examiner—Tan Dinh
Attorney, Agent, or Firm—Ratner & Prestia

[57] ABSTRACT

In a reference clock signal generator for generating a sampled servo format reference clock signal using a PLL circuit, an unique distance is detected by an output signal of a VCO in a state the PLL circuit is operated based on a clock signal which corresponds to a number of rotations of a disk in generating the reference clock signal. When the unique distance is detected, a dividing ratio of a frequency divider is changed to operate the PLL circuit based on a clock mark detecting signal. The dividing ratio is set so that an oscillation frequency of the VCO becomes constant before and after switching from the clock signal that corresponds to the number of rotations of the disk to the clock mark signal. A count of the frequency divider is preset to zero with the first clock mark signal after the detection of the unique distance and the detection of the clock marks thereafter is carried out based on the count of the frequency divider.

12 Claims, 28 Drawing Sheets

# REFERENCE CLOCK GENERATOR FOR SAMPLED SERVO TYPE DISK UNIT AND DISK UNIT

BACKGROUND OF THE INVENTION

1. Field of the Invention

The present invention relates to a reference clock signal generator for generating a reference clock signal for recording information on a disk in a sampled servo format or reproducing information recorded therein.

2. Description of the Related Art

A sampled servo type optical disk will be explained at first with reference to FIG. 1. In the figure, a substrate 1001 of the optical disk is formed by a resin such as polycarbonate having a thickness of 1.2 mm for example. On one surface thereof, clock marks (also called as a clock pit) 1005, first and second wobble marks 1006 and 1007 among marks called wobble marks (also called as a tracking mark or tracking pit) are formed by such a method as injection. The clock marks 1005 and wobble marks 1006 and 1007 are located on and near intersections of radial straight lines originated from a center O of the substrate of the recording medium 1001 and center lines of spiral or cocentric tracks shown by dashed lines. The first wobble mark 1006 and second wobble mark 1007 for tracking servo are disposed at positions slightly shifted (e.g. ¼ track pitch each) on the both sides of the center line of the track before and after the clock mark 1005 for synchronization. The clock mark 1005 and wobble marks 1006 and 1007 form a servo area 1002. An information area 1003 is formed also radially between each servo area 1002. Marks 1011 are disposed on intersections of a radial straight line 1013 originated from the center O of the substrate of the recording medium 1001 and the center lines of the spiral or cocentric tracks shown by the dotted lines 1004 in several information areas 1010 among a plurality of information areas on one track. Further, marks 1012 are disposed on intersections of a radial straight line 1014 originated from the center O of the substrate of the recording medium 1001 and the center lines of the spiral or cocentric tracks shown by the dotted lines 1004. The marks 1011 and 1012 are formed by means of injection or the like similarly to the clock marks 1005. Marks indicating an address of the track are formed in the information area 1010 and marks indicating data are formed in an information area 1003 similarly by means of injection method or the like. A reflecting film made of aluminum or the like is formed on the surface thereof. Here, an angle formed between the straight lines 1013 and 1014 is kept the same in every information areas 1010. Further, the angle is set at a value which is not same as the angles formed by these radial lines which are formed by the each marks in the servo areas 1002, information areas 1003 and information areas 1010. Accordingly, when the disk is rotated at a constant number of rotations, the time interval from the mark 1011 to the mark 1012 does not exist in other areas. The time interval from the mark 1011 to the mark 1012 is generally called as an unique distance, which shall be referred to as "UD" hereinafter. A typical diagram (a) shown in FIG. 2 shows the arrangement of the marks (pits) on the disk shown in FIG. 1. The first wobble marks are shown by 1006a through 1006d, clock marks are shown by 1005a through 1005d and second wobble marks are shown by 1007a through 1007d. By the way, the marks (not shown) representing the address of the track are formed in the address area of the information area 1010 and the marks (not shown) representing data are formed in the information area 1003. All of the marks are formed in synchronization at positions determined by equally dividing intervals between the clock marks by a predetermined value. Accordingly, when information is to be reproduced or recorded, a reference clock signal which becomes reference for the reproduction or recording of the information is produced by means of a PLL (Phase Locked Loop) circuit based on clock mark signals obtained by detecting the clock marks. A waveform (b) shows the reference clock signal. As described above, the period of the UD area from the mark 1011 to the mark 1012 is not generated in other areas. Accordingly, the clock marks 1005 disposed at a predetermined interval from the mark 1012 are sampled out by detecting this UD areas. In the same time, the aforementioned reference clock signal is generated based on the detected clock marks 1005, using the PLL circuit. The clock marks 1005 disposed at a predetermined period based on the UD area are detected before when an operation of the PLL circuit become stable. When the operation of the PLL circuit becomes stable, gate signals for detecting clock marks are produced based on the reference clock signal generated by the PLL circuit to detect the clock marks 1005. Further, based on the reference clock signal, gate signals for detecting the first wobble marks 1006 and second wobble marks 1007 are produced. A difference of reflected light amount from the disk caused by the first wobble mark and second wobble mark is detected using the gate signals to detect a deviation of a light beam from the center of the track for tracking control.

As described above, if the number of the UD areas in one track is reduced in the prior art optical disk drive apparatus to enhance recording density, a number of the gates for detecting clock marks produced based on one UD area increases. Generally, the position of the clock mark fluctuates due to decentering of the disk or fluctuation of rotation of a motor. Accordingly, the gates for detecting clock marks may shift from the positions of the clock mark as time elapses from a point of time when the UD area is detected. However, because several tens of clock marks have to be accurately detected in order for the PLL circuit to become steady, the PLL circuit cannot be put into a stable state.

Further, in the prior art optical disk unit, pulse signals which correspond to marks in a period when the gate signal for detecting clock mark is opened are input to the PLL circuit to generate the reference clock signal. In this method however, if pseudo pulses are generated due to noise and others in the period when the gate signal for detecting clock mark is opened, the PLL circuit operates based on the pseudo pulses. As a result, the PLL circuit outputs signals different from the reference clock signal. Because the gate signal for detecting clock mark is produced based on the reference clock signal which is an output signal of the PLL circuit, the clock marks cannot be detected. As a result, the output signal from the PLL circuit further shifts from the reference clock signal.

Further, because the gate signals for detecting wobble marks also shift in the same manner, the deviation of the light beam from the center of the track cannot be detected, making the tracking control unstable.

SUMMARY OF THE INVENTION

Accordingly, it is an object of the present invention to provide a reference clock signal generator for a sampled servo type disk unit which can accommodate with a high density disk in which a number of UD areas in one track is reduced and can shift to a state in which a reference clock signal is stably produced in a short time.

In order to achieve the aforementioned object, the reference clock signal generator of the present invention comprises:

a VCO for generating a clock signal;

frequency dividing means for dividing the clock signal output by the VCO by counting it;

clock mark detecting means for detecting clock marks based on a count of the frequency dividing means;

clock oscillating means for generating clock signals which correspond to a number of rotations of a disk;

switching means for switching an output signal of the clock mark detecting means and an output signal of the clock oscillating means to output;

phase comparing means for comparing phases of an output signal of the switching means and an output signal of the frequency dividing means to sent to the VCO;

unique distance detecting means for detecting an unique distance based on the clock signal output by the VCO; and reference mark detecting means for detecting predetermined marks based on an output signal of the unique distance detecting means.

In producing the reference clock signal, the switching means switches so as to output the signal of the clock oscillating means and sets a dividing ratio of the frequency dividing means so that an oscillation frequency of the VCO becomes equal to a frequency of the reference clock signal, the switching means switches so as to output the signal of the clock mark detecting means when the unique distance detecting means detects an unique distance, and a count of the frequency dividing means is preset corresponding to an output signal of the reference mark detecting means after setting the dividing ratio of the frequency dividing means so that the oscillation frequency of the VCO becomes equal to the frequency of the reference clock signal.

Accordingly, the frequency of the clock signals generated by the VCO are equal before and after the detection of the unique distance and the count of the frequency divider is preset by the predetermined mark signal after the detection of the unique distance, so that the PLL circuit is shifted to the condition synchronized with the clock marks stably and swiftly.

Another object of the present invention is to provide a reference clock signal generator whose reference clock signal will not be influenced by noise even if it is generated near the clock marks.

In order to achieve the aforementioned object, the reference clock signal generator of the present invention comprises:

mark detecting means for outputting pulses obtained by detecting marks on the disk;

a VCO for generating the reference clock signal;

frequency dividing means for dividing the clock signal output by the VCO by counting it;

clock mark gate generating means for generating a gate signal for detecting clock mark based on the count of the frequency dividing means;

clock mark detecting means for detecting the pulses which correspond to the clock marks from the pulses of the mark detecting means based on an output signal of the clock mark gate generating means;

phase comparing means for comparing phases of an output signal of the clock mark detecting means and an output signal of the frequency dividing means to sent to the VCO; and noise detecting means for detecting a case when the count of the pulse counting means is other than 1 during a gate period in which the output signal of the clock mark gate generating means is output to stop the operation of the phase comparing means corresponding to the output signal of the noise detecting means.

Accordingly, the PLL circuit may be prevented from erroneously operating by detecting that the noise has been generated during the period of the gate for detecting clock mark and by stopping the operation of the phase comparing means.

BRIEF DESCRIPTION OF THE DRAWINGS

The specific nature of the present invention, as well as other objects, uses and advantages thereof, will clearly appear from the description and from the accompanying drawings, in which.

DETAILED DESCRIPTION OF PREFERRED EMBODIMENT

Figure 1:
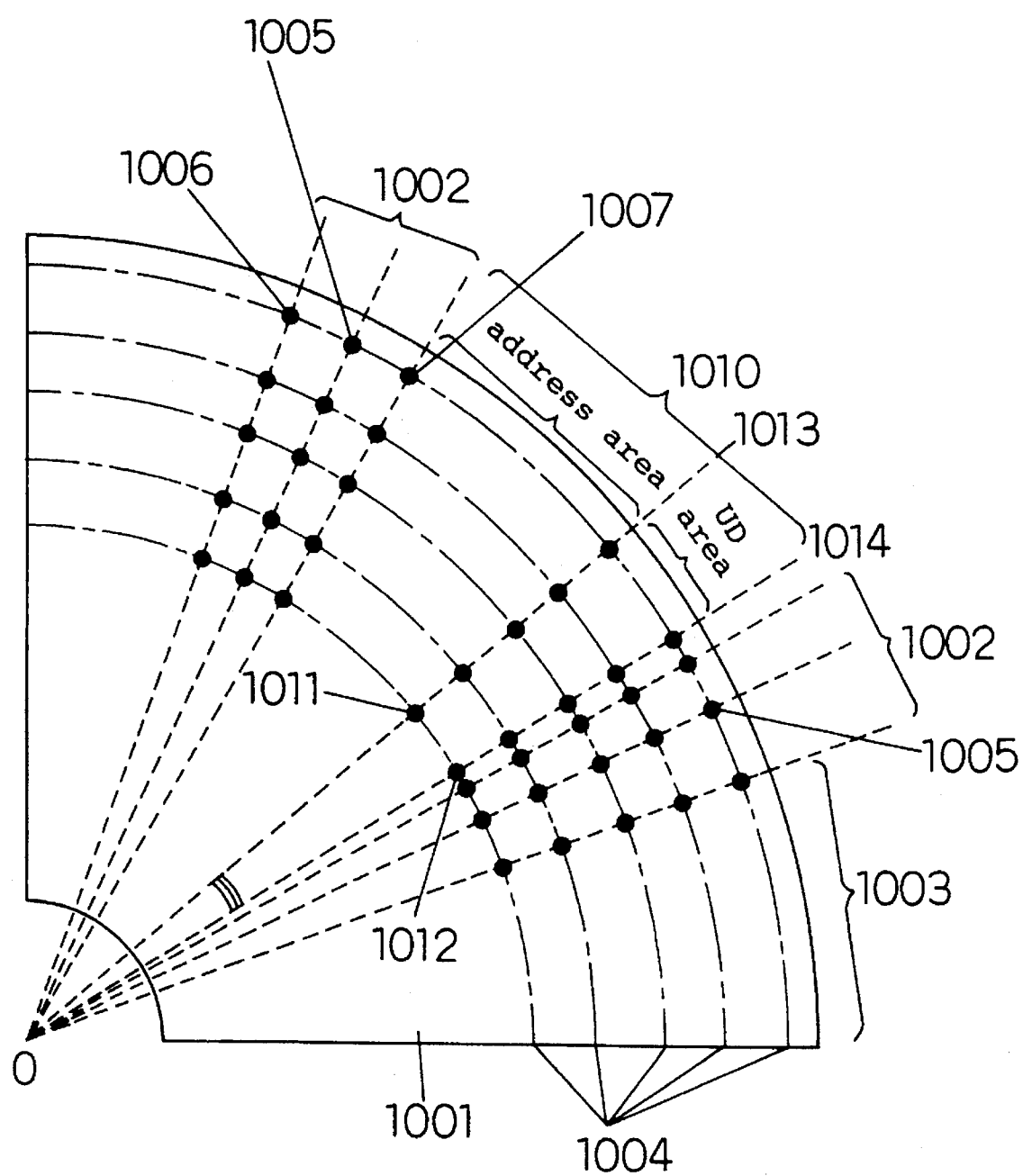
FIG. 1 is an optical disk for explaining a prior art reference clock signal generator.
Figure 2:
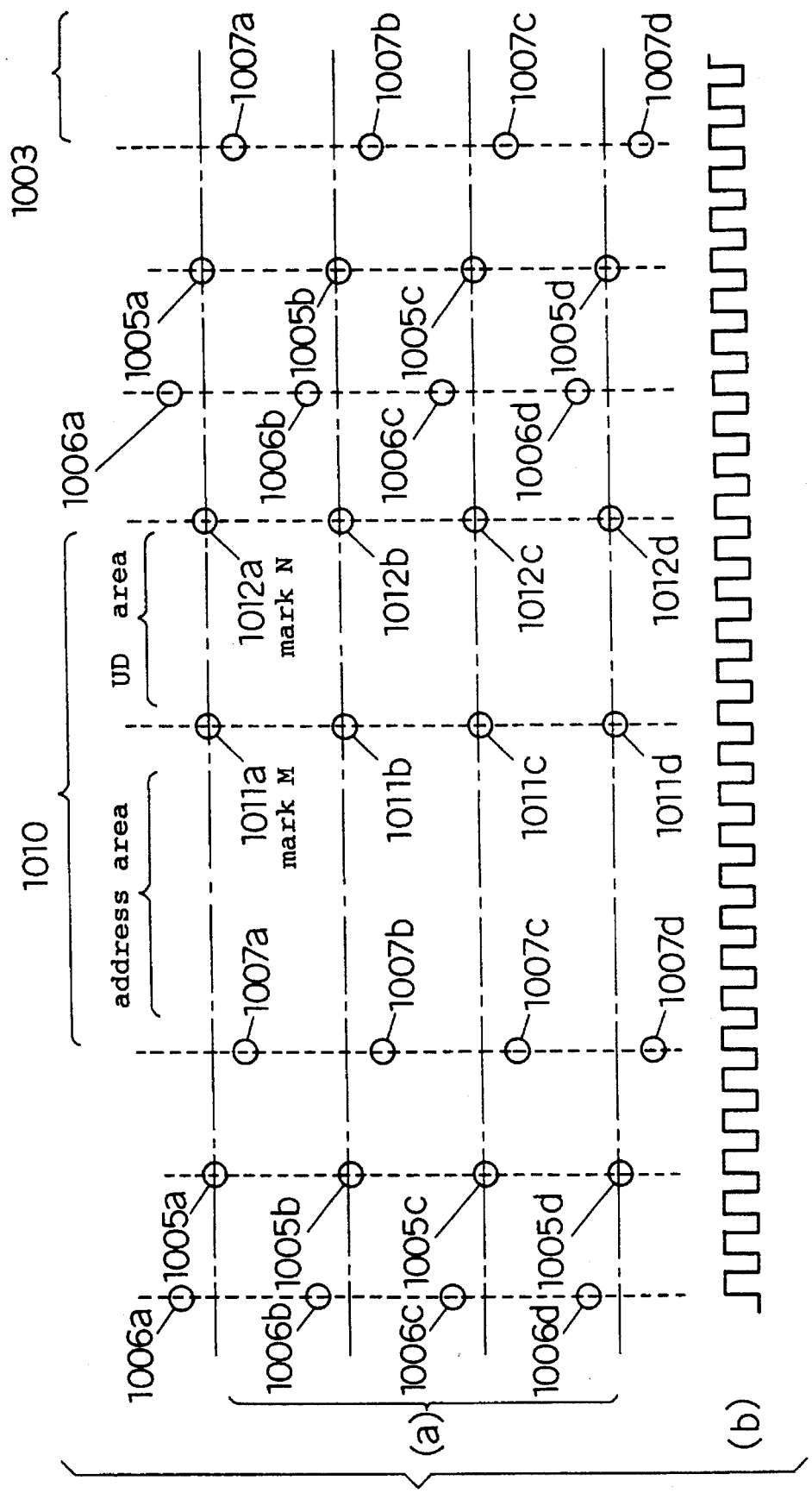
FIG. 2 is a typical diagram of the optical disk.

An outline of the present invention will be explained with reference to FIG. 1 which shows an optical disk. By the way, FIG. 1 has been used for explaining the prior art reference clock signal generator. Marks are formed in synchronization at positions determined by equally dividing intervals between clock marks 1005 by a predetermined value. Accordingly, when information is to be reproduced or recorded, a reference clock signal is produced by means of a PLL (Phase Locked Loop) circuit based on clock mark signals obtained by detecting clock marks to reproduce or record the information based on the reference clock signal. Hereinafter, a state in which the reference clock signal is produced shall be described as an operation mode. Here a basic construction of the PLL circuit will be explained briefly.

The PLL circuit is comprised of a VCO (Voltage Controlled Oscillator) for generating a clock signal, a frequency divider for diving the clock signal to output divided pulses, a phase comparator for comparing phases of the clock mark signals and divided pulses and a loop filter for producing control signals for the VCO based on the output of the phase comparator. By the way, the frequency divider counts the clock signals output by the VCO and when it counts up a predetermined number of clocks, it clears the count and starts to count again. The frequency divider repeats this operation. The frequency divider outputs the divided pulses when the count is zero and sends them to the phase comparator circuit. Accordingly, the VCO produces the reference clock signal as a dividing ratio of the frequency divider is set at a predetermined value. By the way, the frequency divider is adapted so that the count becomes zero when it is cleared.

Next an operation for shifting to the operation mode will be explained.

A period of the UD area from the mark 1011 to mark 1012 is a period which is not generated in other areas. Accordingly, the clock marks 1005 disposed at predetermined intervals from the mark 1012 are detected by detecting the UD area. The UD area is detected based on a clock signal produced so as to have the same frequency with the reference clock signal.. Hereinafter this clock signal shall be described as a clock signal for detecting UD. The clock signal for detecting UD is produced by inputting a clock signal which corresponds to a speed of rotation of the disk, instead of the clock mark signal, to the phase comparator of the PLL circuit and by setting the dividing ratio of the frequency divider at a predetermined value 1/N. Hereinafter a condition in which the clock signal for detecting UD is produced shall be described as a standby mode.

In the standby mode, the dividing ratio is changed from 1/N to 1/M as the UD area is detected. By the way, the dividing ratio 1/M is a value by which the VCO produces the reference clock signal when the input of the phase comparator is the clock mark signal. Further, the input of the phase comparator is changed from the clock signal which corresponds to the speed of rotation of the disk to the clock mark signal obtained by detecting the clock marks. Then the first clock mark after the detection of the UD area is detected and the count of the frequency divider is cleared. Accordingly, the divided pulses are output and are synchronized with the clock mark signals. Because timings of zero count is synchronized with the clock mark signal, clock marks on and after the second one after the detection of the UD area may be detected by producing gate signals for detecting clock marks based on the count of the frequency divider and by using the gate signals. Accordingly, the mode can be shifted from the standby mode to the operation mode. By the way, because oscillation frequency of the VCO is almost constant even if the mode shifts from the standby mode to the operation mode, the shift can be made stably and quickly.

Figure 3:
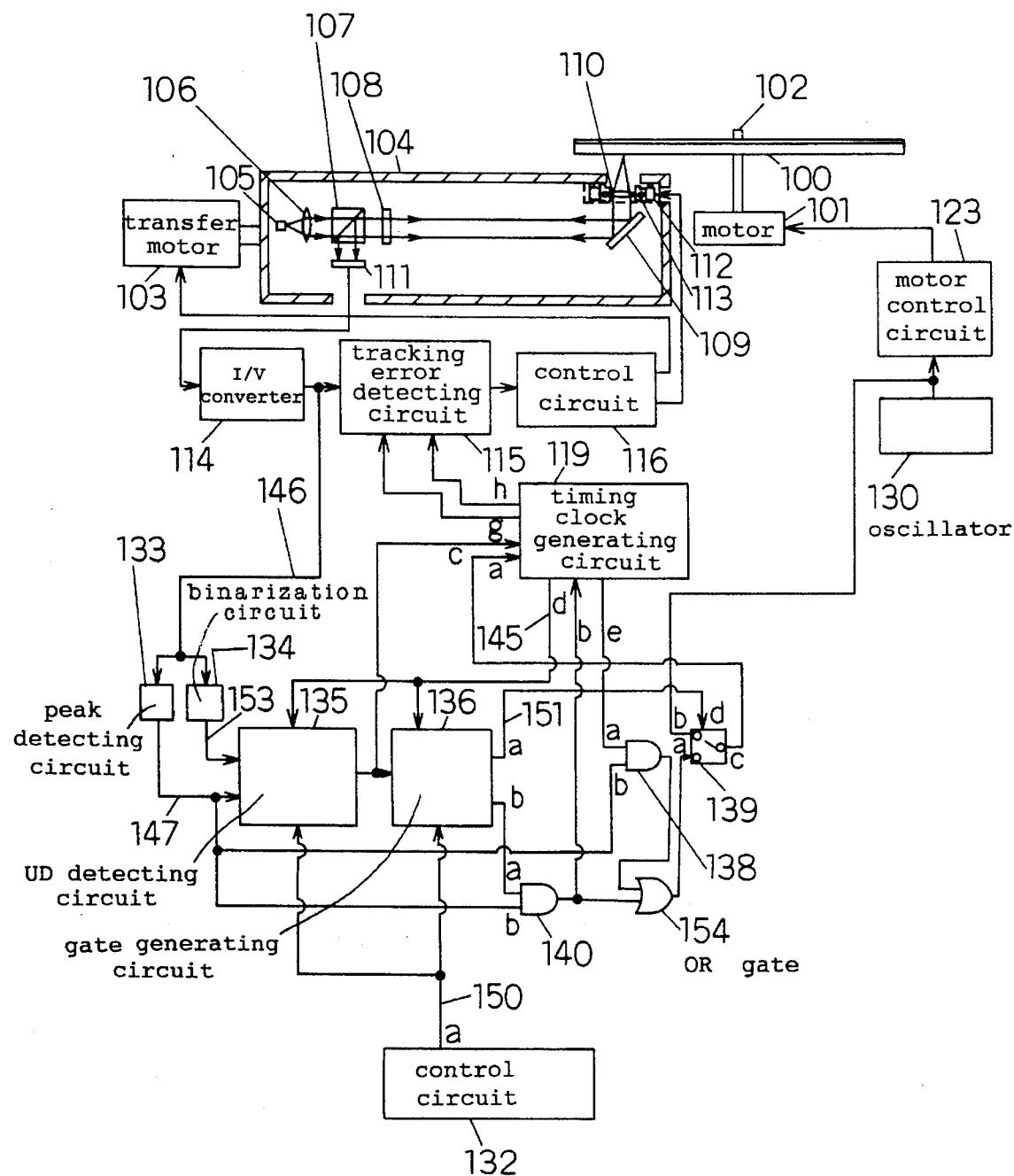
FIG. 3 is a block diagram of a reference clock signal generator according to a first embodiment of the present invention.

Now the optical disk drive apparatus using the reference clock signal generator of the first embodiment of the present invention will be explained in detail with reference to FIG. 3 which is a block diagram thereof. In the figure, a disk 100 is mounted on a rotary shaft 102 of a motor 101. The motor 101 is controlled by a motor control circuit 123 so that it rotates at a speed of rotation which corresponds to a clock signal output by an oscillator 130.

Mounted within a transfer table 104 are, for example, a light source 105 such as a semiconductor laser, coupling lens 106, polarizing beam splitter 107, ¼ wavelength plate 108, total reflection mirror 109, photo detector 111 and stationary section of an actuator 112. The transfer table 104 is constructed so as to move in the radial direction of the disk 100 by a transfer motor 103 such as a linear motor.

A light beam generated from the light source 105 such as a semiconductor laser disposed within the transfer table 104 is made into a parallel light by the coupling lens 106, passes through the polarizing beam splitter 107 and ¼ wavelength plate 108, is reflected by the total reflection mirror 109, is focused by a focusing lens 110 to be irradiated on a recording plane. A reflection light reflected from the recording plane of the disk 100 passes through the focusing lens 110, is reflected by the total reflection mirror 109, passes through the ¼ wavelength plate 108, is reflected by the polarizing beam splitter 107 and is irradiated on the photo detector 111. The focusing lens 110 is attached on a movable section of the actuator 112. When a current is flown through a coil 113 for tracking, the focusing lens 110 moves in the radial direction of the disk 100, i.e. across the tracks on the disk 100 (in the lateral direction in the figure), by an electromagnetic force which it receives from a permanent magnet (not shown) attached at the stationary section. Further, a coil for focusing (not shown) is also attached to the movable section of the actuator 112 and when a current is flown through this coil, the focusing lens 110 moves in a direction perpendicular to the plane of the disk 100 by an electromagnetic force which the coil receives from a permanent magnet (not shown) attached to the stationary section. Then, focus of the focusing lens 110 is always controlled so that the light beam irradiated on the disk 100 is always focused. Assume that the state in the following explanation is when the focus control is normally operated. The reflected light from the disk 100 is received by the photo detector 111 and is converted into a current. Because the amount of reflected light changes corresponding to existence of marks on the disk, an output value from the photo detector 111 changes corresponding to the existence of the marks on the disk. Accordingly, an output level of an I/V converter 114 indicates the existence of the marks on the disk. The output of the I/V converter 114 is sent to a peak detecting circuit 133 and binarization circuit 134. The peak detecting circuit 133 outputs a pulse which indicates a center position of a mark on the disk. The binarization circuit 134 converts the input signal into binary levels of high level or low level at a predetermined level. By the way, it is arranged so that the high level represents a mark. Hereinafter, the output signal from the peak detecting circuit 133 shall be described as a peak detection signal. Pulses which correspond to the clock marks in the peak detection signal are the clock mark signals described above. An output signal from the binarization circuit 134 shall be also described as a binarized signal.

Now a rough flow of operations of the block diagram shown in FIG. 3 will be explained below. A control circuit 132 sends a command to a gate generating circuit 136 and unique distance detecting circuit (hereinafter referred to as an UD detecting circuit) 135 via a data line 150 so that the optical disk drive apparatus is turned into the standby mode. The gate generating circuit 136 connects terminals (b) and (c) of a switch 139 via a data line 151. Then an output signal of an oscillator 130 is input to a terminal (a) of a timing clock generating circuit 119. The timing clock generating circuit 119 includes the aforementioned PLL circuit and is synchronized with clocks input to the terminal (a) and produces clocks having a frequency N or M times of the inputted clocks. 1/N or 1/M is a dividing ratio of the frequency divider included in the PLL circuit. The timing clock generating circuit 119 outputs the produced clocks to the UD detecting circuit 135 and the gate generating circuit 136 from a terminal (d). By the way, switching of the dividing ratio 1/N or 1/M is controlled with a level of the terminal (c). In the standby mode, 1/N is selected. By the way, the dividing ratio 1/N is preset so that the frequency of the clocks output from the terminal (d) becomes equal to that of the reference clock signal.

In the standby mode, the control circuit 132 sends a command to the UD detecting circuit 135 and the gate generating circuit 136 via the data line 150 to shift to the operation mode.

Receiving the command for shifting to the operation mode, the UD detecting circuit 135 detects that a light beam spot has passed through the UD area based on the clock signals from the terminal (d) of the timing clock generating circuit 119, peak detection signal and binarized signal output. When the UD detecting circuit 135 detects the UD area, the gate generating circuit 136 switches the dividing ratio of the timing clock generating circuit 119 from 1/N to 1/M. Here the dividing ratio 1/M is preset at a value by which the PLL circuit generates clocks having the equal frequency with the reference clock signal when the clock mark signal is input to the terminal (a). Further, the gate generating circuit 136 generates a gate signal for detecting a first clock mark after the detection of the UD area based on the timing by which the UD area has been detected. This gate signal is sent to a terminal (a) of an AND gate 140.

Because the peak detection signal has been input to a terminal (b) of the AND gate 140, an output of the AND gate 140 becomes a first clock mark signal after the detection of the UD area. This clock mark signal is sent to the terminal (b) of the timing clock generating circuit 119.

Receiving the first clock mark signal after the detection of the UD area at the terminal (b), the timing clock generating circuit 119 clears the count of the frequency divider in the PLL circuit. Accordingly, a second clock mark and thereafter after the detection of the UD area can be detected based on the count of the frequency divider in the timing clock generating circuit 119. The gate signal for detecting clock marks generated based on the count is sent from a terminal (e) of the timing clock generating circuit 119 to a terminal (a) of an AND gate 138. Because the peak detection signal has been input to a terminal (b) of the AND gate 138, an output of the AND gate 138 becomes a clock mark signal.

The terminal (c) of the switch 139 is separated from the terminal (b) just before the first clock mark signal after the detection of the UD area and is connected to the terminal (a). Accordingly, the clock mark signal after the detection of the UD area is sent to the terminal (a) of the timing clock generating circuit 119. Because the dividing ratio of the PLL circuit contained in the timing clock generating circuit 119 has been switched to 1/M, a reference clock signal is generated when the clock mark signal is input to the terminal (a). Thereby the shift to the operation mode is completed.

Figure 4:
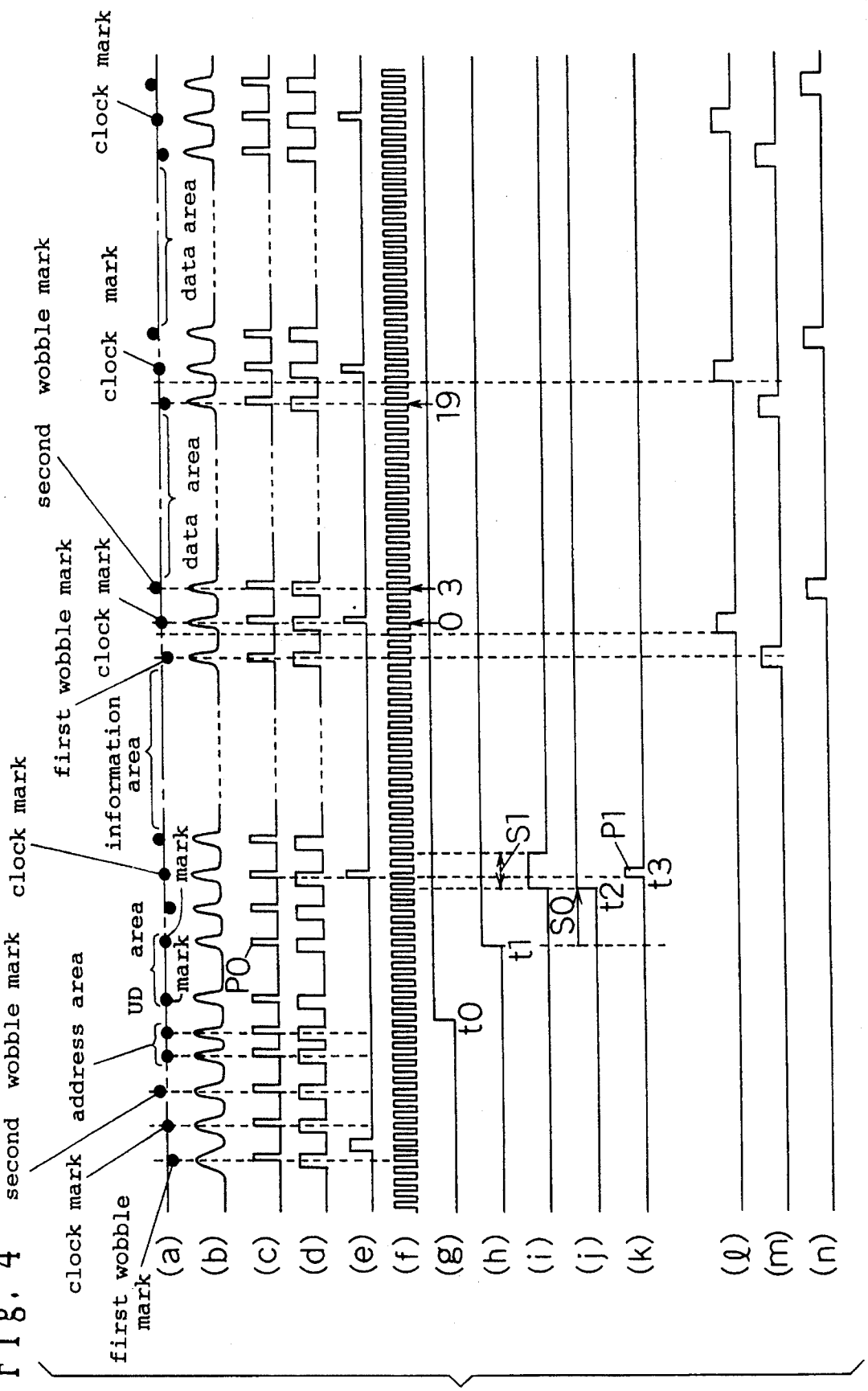
FIG. 4 is a waveform chart showing waveform of each section of the first embodiment.

Next the operation of the optical disk drive apparatus shown in FIG. 3 will be explained with reference to a waveform chart shown in FIG. 4. A typical diagram (a) is a diagram typically showing the array of the marks on the prior art disk shown in Pig. 1. A waveform (b) represents the output signal of the I/V converter 114, a waveform (c) the output signal of the peak detecting circuit 133, a waveform (d) the output signal of the binarization circuit 134, a waveform (e) the output signal of the switch 139, a waveform (f) the signal of the output terminal (d) of the timing clock generating circuit 119, a waveform (g) the signal of the output terminal (a) of the control circuit 132, a waveform (h) the output signal of the UD detecting circuit 135, a waveform (i) the signal of the output terminal (b) of the gate generating circuit 136, a waveform (j) the signal of the output terminal (a) of the gate generating circuit 136, a waveform (k) the output signal of the AND gate 140, a waveform (l) an output signal of a terminal (e) of the timing clock generating circuit 119, a waveform (m) an output signal of a terminal (g), and a waveform (n) an output signal of a terminal (h) of the timing clock generating circuit 119, respectively.

In the typical diagram (a), the first and second wobble marks are disposed shifting above and under the center line (dotted line) in the figure. Here assume that the wobble marks, address mark and marks for forming the UD area are formed on any of positions in an interval between the clock marks divided into 22 equal parts. Also assume that each position on the 22 equally divided part are represented from zero-th bit to 21st bit and that the clock mark positioned at the zero-th bit, the second wobble mark at the third bit, the head mark of the UD area at the 11-th bit, the ending mark of the UD area at the 16-th bit and the first wobble mark at the 19-th bit, respectively. Further, assume that the bits from the zero-th bit to the 21st bit are grouped as one block and that one track is composed of 1000 blocks. By the way, in a state when the disk is rotating at a predetermined number of rotations, a clock synchronized with the zero-th bit to the 21st bit becomes the reference clock signal. Assume that data is recorded in the information area.

The distance of the UD area is an unique distance which is not brought about by data recorded in the information area or marks for address, clock marks or wobble marks formed beforehand.

When a light beam spot moves on the disk shown in the typical diagram (a), the output signal of the I/V converter 114 turns out as shown in the waveform (b). Such output signal is sent to the binarization circuit 134 and the peak detecting circuit 133. The binarization circuit 134 binarizes the inputted signal in a predetermined level and outputs the binarized signal shown by the waveform (d). The peak detecting circuit 133 outputs the peak detection signal shown by the waveform (c) detecting the center position of the marks.

The signal of the output terminal (a) of the control circuit 132 is low level before time t0 (as shown by the waveform (g)). By the way, the unit is in the standby mode before time t0. The gate generating circuit 136 outputs a low level signal to the terminal (a) when the signal of the output terminal (a) of the control circuit 132 is low level.

The switch 139 is arranged so that the terminals (a) and (c) are connected when the control terminal (d) is high level and that the terminals (b) and (c) are connected when it is low level. Accordingly, the terminals (b) and (c) are connected in the standby mode and the output signal of the oscillator 130 is input to the terminal (a) of the timing clock generating circuit 119 (as shown by the waveform (e)).

The PLL circuit contained in the timing clock generating circuit 119 operates based on the output signal of the oscillator 130 which corresponds to the speed of rotation of the motor and generates a clock signal having a frequency N times of the output signal. By the way, as described above, the clock signal generated by the PLL circuit become a signal having the same frequency with the reference clock signal. That is, the clock for detecting UD is output from the terminal (d) of the timing clock generating circuit 119.

The waveform (f) represents the waveform output from the terminal (d) of the timing clock generating circuit 119. It is the clock signal for detecting UD before time t1.

When the signal at the output terminal (a) of the control circuit 132 becomes high level at time t0 (as shown by the waveform (g)), the UD detecting circuit 135 starts an operation for detecting the UD area based on the binarized signal and peak detection signal.

Because the distance of the UD area is the unique distance which is not brought about by data recorded in the information area or marks for address, clock marks or wobble marks formed beforehand as described above, the UD area is detected by measuring a low level period of the binarized signal (as shown by the waveform (d)) by the clock signal for detecting UD output from the terminal (d) of the timing clock generating circuit 119. By the way, because the measurement is made using the clock for detecting UD having the same frequency with the reference clock signal, it can be accommodated without changing the arrangement even when the frequency of the oscillator 130 is changed to change the number of rotations of the motor 101.

The UD detecting circuit 135 switches the output to high level when the UD area is detected at time t1 (as shown by the waveform (h)). Because the terminal (c) of the timing clock generating circuit 119 is set at high level when the waveform (h) becomes high level at time t1, the dividing ratio of the PLL circuit is switched to 1/M.

When the signal sent from the UD detecting circuit 135 is switched to high level, the gate generating circuit 136 outputs the gate signal for detecting the first clock mark after the detection of the UD area to the terminal (b) (as shown by the waveform (i)). The gate signal shown in the waveform (i) is a signal which is high level only during a period of time s1 after passing time s0 from time t1. By the way, this gate signal is produced based on the clock signal for detecting UD.

The gate signal (as shown by the waveform (i)) for detecting the first clock mark after the detection of the UD is input to the terminal (a) of the AND gate 140 and the peak detection signal is input to the terminal (b). Accordingly, the output of the AND gate 140 is the first clock mark signal right after the detection of the UD area (shown by the waveform (k)). The count of the frequency divider in the PLL circuit is cleared by the pulse P1 shown in the waveform (k). Accordingly, the divided pulse is almost synchronized with the clock mark signal. The operation of the frequency divider will be detailed later.

The signal at the output terminal (e) of the timing clock generating circuit 119 is a gate signal for detecting the clock mark and is generated based on the count of the frequency divider.

The count of the frequency divider is cleared by the first clock mark signal right after the detection of the UD area (shown by the waveform (k)) and the divided pulse and the clock mark are synchronized. Accordingly, gate signals for detecting the second clock mark and thereafter after the detection of the UD area may be generated based on the count of the frequency divider. Then the outputs of the AND gate 138 become clock mark signals (as shown by the waveform (l)). Because the clock mark signals are input to the terminal (a) of the timing clock generating circuit 119, the timing clock generating circuit 119 stably generates the reference clock signal. The output of the terminal (g) of the timing clock generating circuit 119 is a gate signal for detecting the first wobble mark (as shown in the waveform (m)) and the output of the terminal (h) is a gate signal for detecting the second wobble mark (as shown in the waveform (n)). The gate signals shown in the waveforms (m) and (n) are generated based on the count of the frequency divider similarly to the gate signals for detecting the clock marks. A tracking error detecting circuit 115 detects a positional deviation of the light beam spot and the track based on the gate signals sent from the terminals (g) and (h) of the timing clock generating circuit 119 and the signal sent from the I/V converter 114. That is, the tracking error detecting circuit 115 detects peak values of the first and second wobble marks from the output signals of the I/V converter 114 and generates a signal indicating a deviation between the track on the disk 100 and the light beam spot, i.e. a tracking error signal, from a difference between the peak values. This tracking error signal is applied to the actuator 112 via the control circuit 116 and the light beam spot on the disk 100 is controlled so that it comes to the intermediate position between the first and second wobble marks, i.e. the center of the track. The tracking error signal is also applied from the control circuit 116 to the transfer motor 103 to transfer and control the transfer table 104 so that the focusing lens 110 moves in the radial direction on the disk centering on a natural condition.

Now each block will be explained in detail below.

Figure 5:
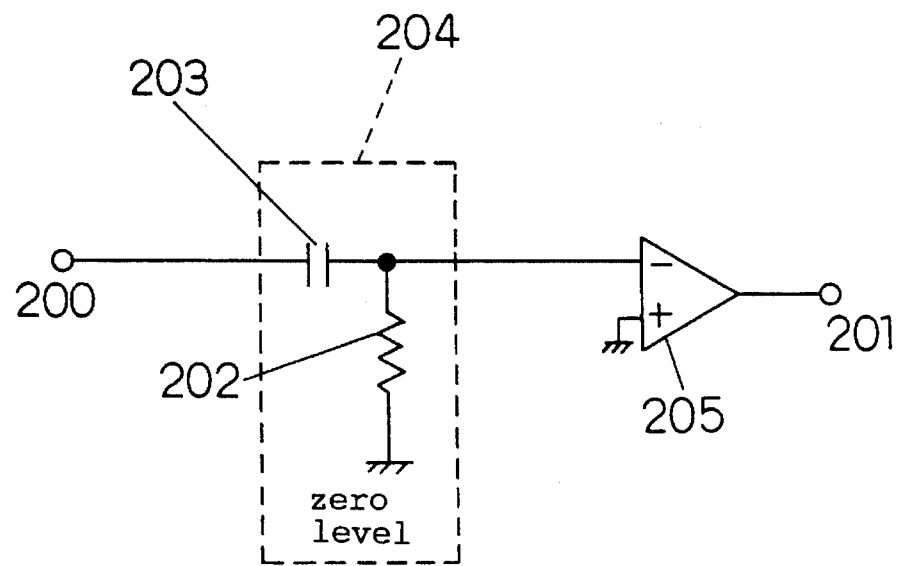
FIG. 5 is a block diagram of a peak detecting circuit of the first embodiment.

At first, the peak detecting circuit 133 will be explained. FIG. 5 is a block diagram of the peak detecting circuit 133. A terminal 200 is connected to a data line 147 in FIG. 3.

Figure 6:
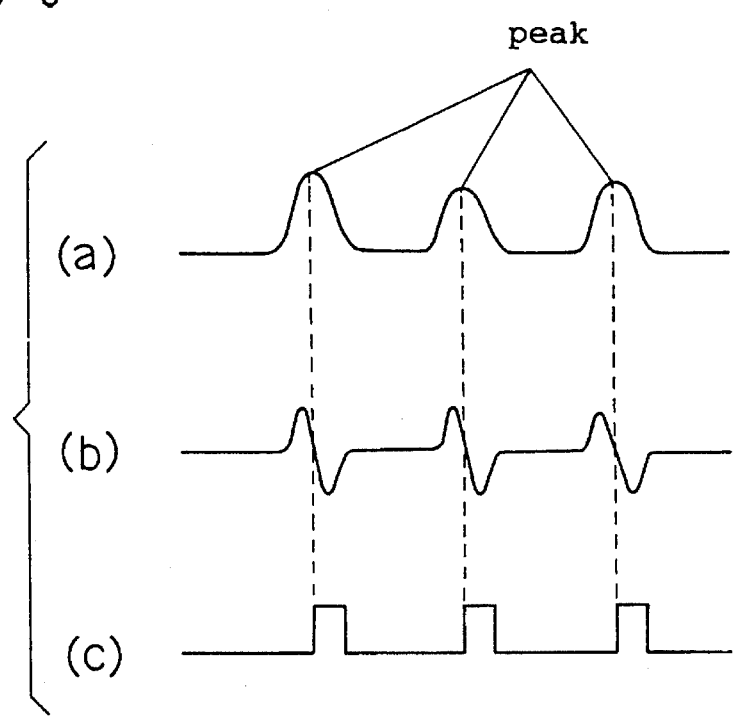
FIG. 6 is a waveform chart showing waveform of each section of the peak detecting circuit of the first embodiment.

A differentiation circuit 204 is composed of a capacitor 203 and resistor 202. A signal input to the terminal 200 is differentiated by the differentiation circuit 204 and is sent to a terminal (−) of a comparator 205. The comparator 205 outputs a high level signal when a level of signal input to a terminal (+) is higher than a level of signal input to the terminal (−) and outputs a low level signal when it is opposite. The terminal (+) of the comparator 205 is set at zero level. An output of the comparator 205 is connected to a terminal 201. The operation of the peak detecting circuit 133 will be explained using waveforms shown in FIG. 6. A vertical axis of each waveform indicates the level of the signal and a horizontal axis indicates time. The operation of the peak detecting circuit 133 when a signal having a waveform (a) is input to the terminal 200 will be explained. The peaks of the waveform (a) indicate the center positions of the marks. A waveform (b) indicates the output of the differentiation circuit 204 and zero-crosses at the peak positions of the waveform (a). The waveform (b) is binarized by the comparator 205 and turns out to be as a waveform (c). A rising edge of the waveform (c) indicates the peak position.

Figure 7:
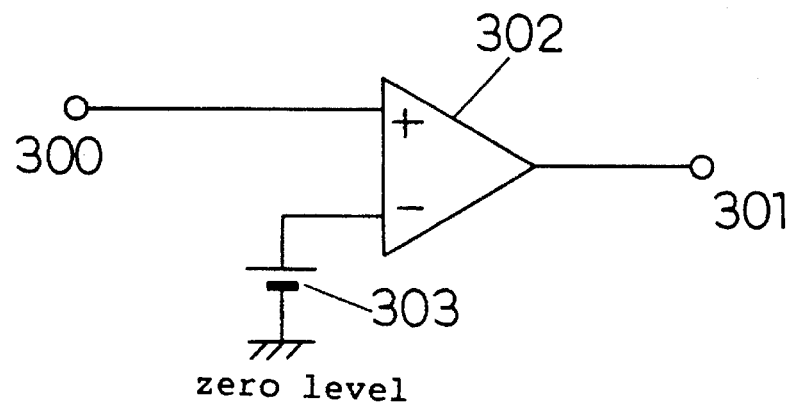
FIG. 7 is a block diagram of a binarization circuit of the first embodiment.

Next, the binarization circuit 134 will be explained. FIG. 7 is a block diagram of the binarization circuit 134. A terminal 300 is connected to a data line 146 and a terminal 301 is connected to a data line in FIG. 3.

The terminal 300 is connected to a terminal (+) of a comparator 302. The comparator 302 outputs a high level signal when a level of signal input to the terminal (+) is higher than a level of signal input to a terminal (−) and outputs a low level signal when it it opposite. A power source 303 set the terminal (−) of the comparator at a predetermined level.

Figure 8:
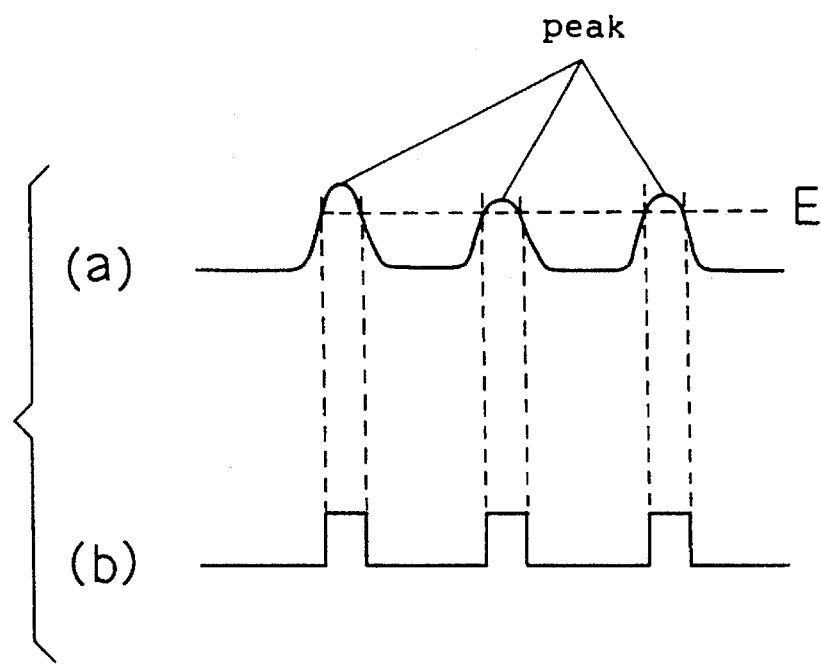
FIG. 8 is a waveform chart showing waveform of each section of the binarization circuit of the first embodiment.

The operation of the circuit will be explained using waveforms shown in FIG. 8. A vertical axis of each waveform indicates a level of signal and horizontal axis indicates time. The operation of the circuit when a signal having a waveform (a) is input to the terminal 300 will be explained. A waveform (b) represents an output waveform of the comparator 302. A level E of the waveform (a) indicates a level of the terminal (−) of the comparator 302 set by the power source 303. The comparator 302 binarizes the signal input to the terminal (+) (shown by the waveform (a)) based on the Level E to bring out a waveform shown by the waveform (b). The high level periods correspond to the positions of the marks on the disk.

Figure 9:
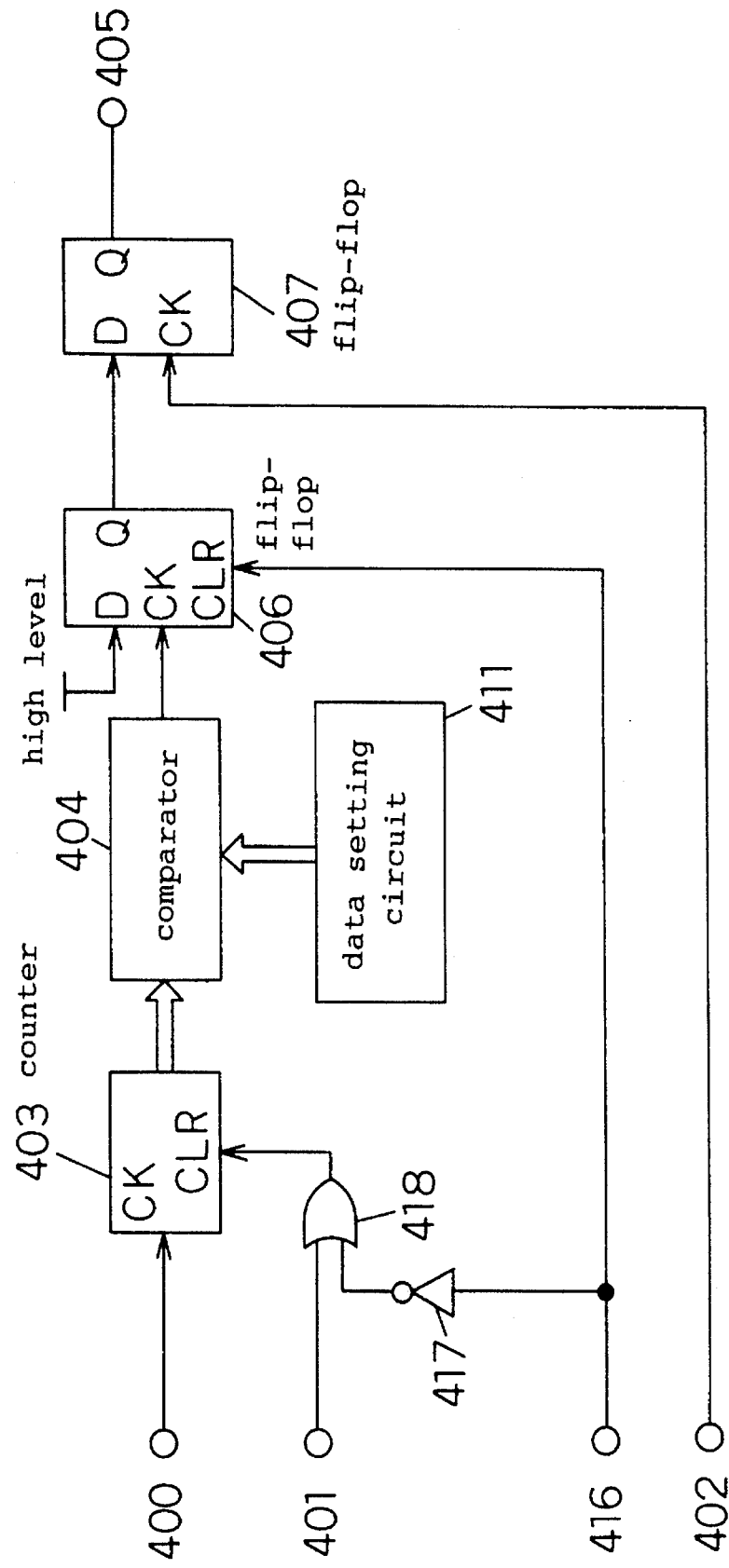
FIG. 9 is a block diagram of an UD detecting circuit of the first embodiment.

Next, the UD detecting circuit 135 will be explained. FIG. 9 is a block diagram thereof. The clock for detecting UD produced in the timing clock generating circuit 119 is input to an input terminal 400. Further, the binarized signal which is the output of the binarization circuit 134 is input to an input terminal 401, the peak detection signal which is the output of the peak detecting circuit 133 is input to an input terminal 402 and the signal at the terminal (a) of the control circuit 132 is input to a terminal 416, respectively. A terminal 405 is connected to the the gate generating circuit 136 and the terminal (c) of the timing clock generating circuit 119 in FIG. 3.

The clock for detecting UD is sent to a terminal CK of a counter 403. The counter 403 counts the clocks input to the terminal CK during period when a terminal CLR is in low level. A comparator 404 compares a count of the counter 403 and a value set in a data setting circuit 411 and outputs a high level signal when they are equal. When the output of the comparator 404 becomes high, an output of a flip-flop 406 becomes high level. A signal output from the flip-flop 406 is connected to a terminal D of a flip-flop 407. The peak detection signal which is the output of the peak detecting circuit 133 is input to a terminal CK of the flip-flop 407. Accordingly, an output of the flip-flop 407 becomes high level when the terminal D is in high level state and the peak detection signal is input to the terminal CK. The output of the flip-flop 407 is sent to a terminal 405.

The operation of the circuit will be explained using the waveforms shown in FIG. 4. Because the signal input to the terminal 416 is the waveform shown by the waveform (g), it becomes high level at time t0. Accordingly, an output of an inverter 417 becomes low level and an output of an OR gate 418 becomes low level. Then the counter 403 starts counting. A slightly smaller value than the count when a period of the UD area is counted by the clock signal for detecting UD (shown by the waveform (f)) is set in the data setting circuit 411. Therefore, the output of the comparator 404 becomes high level just before the mark indicating the end of the period of the UD area. Then the output of the flip-flop 406 becomes high level. When the peak detection signal Po shown in the waveform (c) which corresponds to the ending mark of the UD area is input to the terminal 402 immediately after that, the flip-flop 407 outputs a high level signal (as shown in the waveform (h)). Thereby the UD area is detected.

Figure 10:
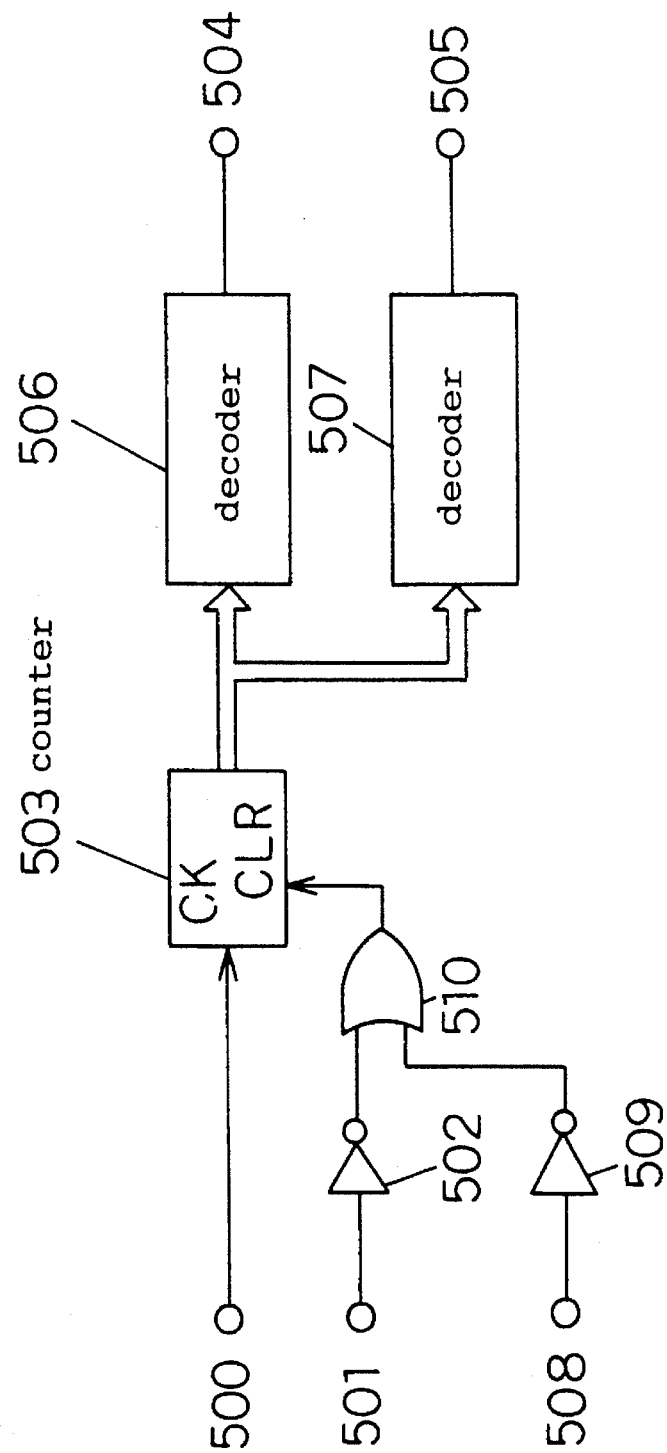
FIG. 10 is a block diagram of a gate generating circuit of the first embodiment.

Next, the operation of the gate generating circuit 136 will be explained using FIG. 10. FIG. 10 is a block diagram of the circuit 136. The clock signal for detecting UD generated in the timing clock generating circuit 119 is input to an input terminal 500. Further, the output signal of the UD detecting circuit 135 is input to an input terminal 501 and the signal of the terminal (a) of the control circuit 132 is input to an input terminal 508, respectively. A terminal 504 is equivalent to the terminal (b) of the gate generating circuit 136 and terminal 505 is equivalent to the terminal (a) in FIG. 3.

The signal input to the terminal 501 is sent to a terminal CLR of a counter 503 via an inverter 502 which outputs by inverting the input signal and an OR gate 510. The counter 503 counts clocks input to a terminal CK during a period when the terminal CLR is in low level and outputs the count to decoders 506 and 507. The decoder 506 outputs a high level signal when the count is equal to a predetermined value and the decoder 507 outputs a high level signal when the count is more than the predetermined value.

The operation of the circuit 136 will be explained referring the waveforms shown in FIG. 4. Because the signal input to a terminal 508 (shown by the waveform (g)) becomes high level at time t0, an output of an inverter 509 becomes low level after time t0. The signal input to the terminal 501 becomes high level at time t1 (as shown by the waveform (h)). Accordingly, the output of the inverter 502 becomes low level and the output of the OR gate 510 becomes low level after time t1. When the output of the OR gate 510 becomes low level at time t1, the counter 503 starts counting. The decoder 506 outputs a high level signal when the count of the counter 509 becomes a value equivalent to time s0 (shown by the waveform (i)) and outputs a low level signal after passing time s1. The decoder 507 outputs a high level signal when the count of the counter 503 becomes a value equivalent to time s0 shown in the waveform (j).

Next, the operation of the timing clock generating circuit 119 will be explained in detail. Assume here that the motor 101 is arranged to rotate once when 100 clocks are input to the motor control circuit 123. Assume also that an oscillation frequency of the oscillator 130 is 4 kHz. Accordingly, the motor 101 rotates at 2400 rpm. A number of blocks per one track of the disk 100 is 1000 and a number of clocks of the reference clock signal per one block is 22. Accordingly, a frequency of the reference clock signal is 880 kHz.

Figure 11:
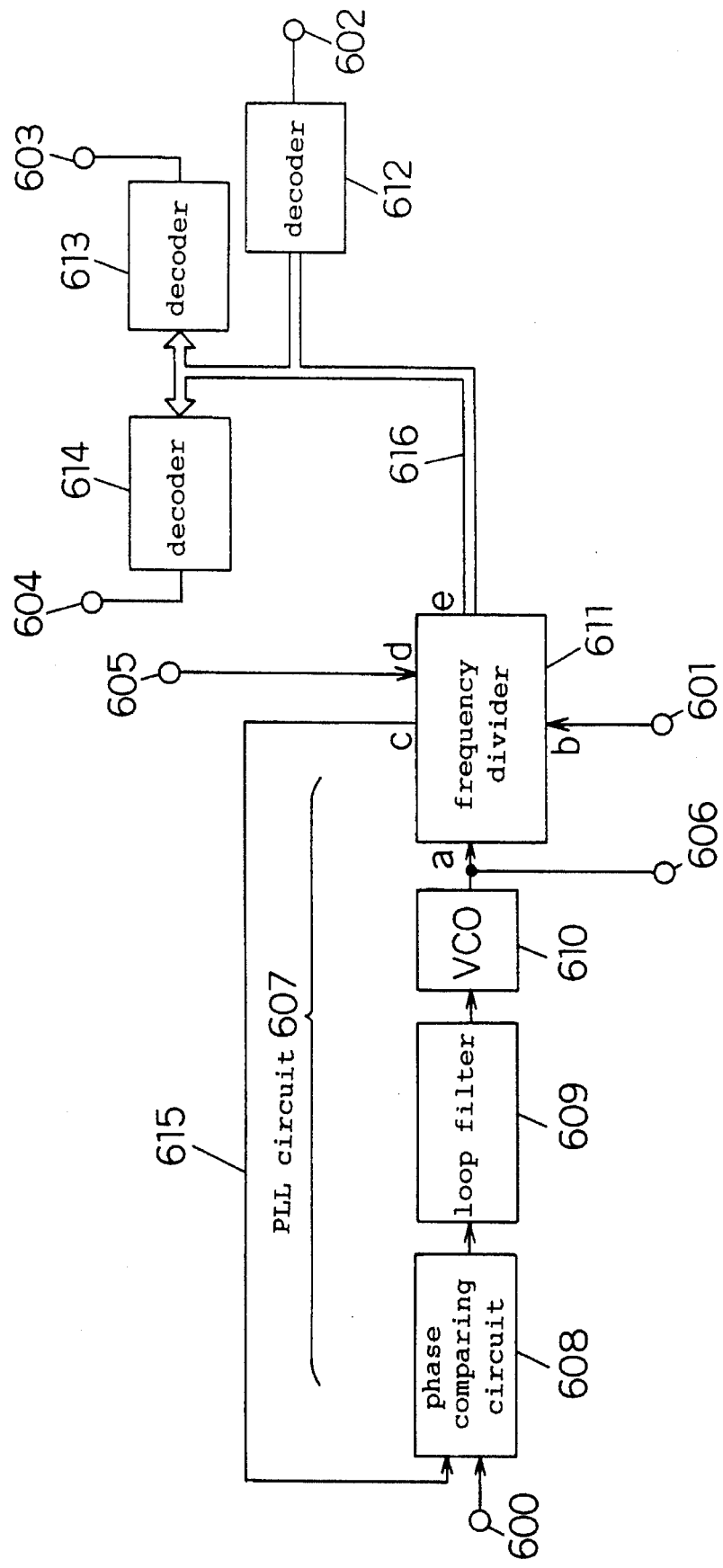
FIG. 11 is a block diagram of a timing clock generating circuit of the first embodiment.

FIG. 11 is a block diagram of the timing clock generating circuit 119. A terminal 600 is equivalent to the terminal (a) of the timing clock generating circuit 119. Also a terminal 601 is equivalent to the terminal (b), a terminal 602 to the terminal (e), a terminal 603 to the terminal (g), a terminal 604 to the terminal (h), a terminal 605 to the terminal (c) and a terminal 606 to the terminal (d), respectively. The timing clock generating circuit 119 comprises a PLL circuit 607 described above. The PLL circuit 607 generates the clock signal for detecting UD and reference clock signal. Further, it generates the gate signals for detecting the first and second wobble marks and the gate signal for detecting the clock mark.

The PLL circuit 607 is composed of a phase comparator 608, loop filter 609, VCO 610 and frequency divider 611.

The frequency divider 611 counts clocks signals output by the VCO 610 and when it counts up integer 1/N or 1/M clocks, it clears the count and starts counting again. The frequency divider 611 repeats this operation. The frequency divider 611 outputs a pulse when the count is zero which is sent to the phase comparator circuit via a data line 615. This pulse is equivalent to the divided pulse described above. By the way, switching of N or M is made through a level of the terminal 605. The frequency divider 611 is arranged so that when a pulse is input to the terminal 601, the internal state is cleared, i.e. the count becomes zero. The phase comparator 608 compares phases of the clock signal input to the terminal 600 and the divided pulse and sends a phase difference signal which corresponds to a difference of phases of the both signals to the VCO 610 via the loop filter 609. Accordingly, the VCO 610 is controlled so that the phases of the clock signal input to the terminal 600 and of the divided pulse match. Here, it is arranged that the dividing ratio of the frequency divider 611 can be set either at 1/220 or 1/22. That is, it is arranged that the dividing ratio becomes 1/22 when the terminal 605 is in high level and 1/220 when it is in low level. By the way, the dividing ratio N described above is 1/220 and the dividing ratio M is 1/22.

An operation of the 199 for generating the clock signal for detecting UD in the standby mode will be explained at first.

In the standby mode, the dividing ratio is 1/220 because a low level signal is input to the terminal d. Accordingly, the oscillation frequency of the VCO 610 is 220 times of the input signal. Here, frequency of the clock signal input to the terminal 600 is 4 kHz, which is the output of the oscillator 130 shown in FIG. 3. Therefore, the oscillation frequency of the VCO 610 is 880 kHz which is the same with that of the reference clock signal. The clock signal oscillated by the VCO 610 is the clock signal for detecting UD.

Because the oscillation frequency of the VCO 610 changes as the frequency of the oscillator 130 changes and the number of rotation of the motor 101 changes, the oscillation frequency of the VCO 610 matches with the frequency of the reference clock signal. Accordingly, the arrangement of the UD detecting circuit 135 and the gate generating circuit 136 needs not be changed.

Next, the operation of the timing clock generating circuit 119 when shifting from the standby mode to the operation mode will be explained referring to the waveforms in FIG. 4. The terminal 605 is set at high level after time t1 of the waveform (h). Accordingly, the dividing ratio of the frequency divider 611 is M (M is 1/22). Then the oscillation frequency of the VCO 610 is 22 times of that of the clock signal input to the terminal 600. By the way, a signal input to the terminal 600 after time t2 shown in the waveform (j) is the clock mark signal. Because the frequency of the clock mark signal is 40 kHz, the oscillation frequency of the VCO 610 is 880 kHz. Because it is the same frequency with that of the clock for detecting UD, the oscillation frequency of the VCO 610 will not change even if the dividing ratio of the frequency divider 611 is changed at time t1.

When the first clock mark signal after the detection of the UD area (pulse P1 in the waveform (k)) is input to the terminal 601, the internal state of the frequency divider 611 is cleared and the count becomes zero. Because the count becomes zero, the frequency divider 611 sends the divided pulse to the phase comparator 608 via the data line 615. Further, the clock mark signal (the pulse P1 in the waveform (k)) is input to the terminal 600 in almost the same timing via an OR gate 154 and a switch 139. Accordingly, the oscillation frequency of the VCO 610 will not be practically changed.

Because the count of the frequency divider 611 becomes zero with the first clock mark signal after the detection of the UD area, the clock mark on the disk and the timing of zero of the count of the frequency divider 611 are almost synchronized. Therefore the count represents what corresponds to time from the clock mark on the disk, i.e. an angle of rotation of the disk. The decoder 612 includes two bit comparators; one bit comparator detects that the count exceeds a predetermined value and the other bit comparator detects that the count is less than the predetermined value. Then the decoder 612 produces a gate signal that the count indicates a predetermined range, i.e. an area of the clock mark, from a logical product. The clock mark is detected based on the produced gate signal indicating the area of the clock mark and is input to the phase comparator 608. Accordingly, the reference clock signal is always produced. Similarly, the decoders 613 and 614 produce gate signals indicating areas of the first and second wobble marks.

Next, a structure of the frequency divider 611 will be explained in detail.

Figure 12:
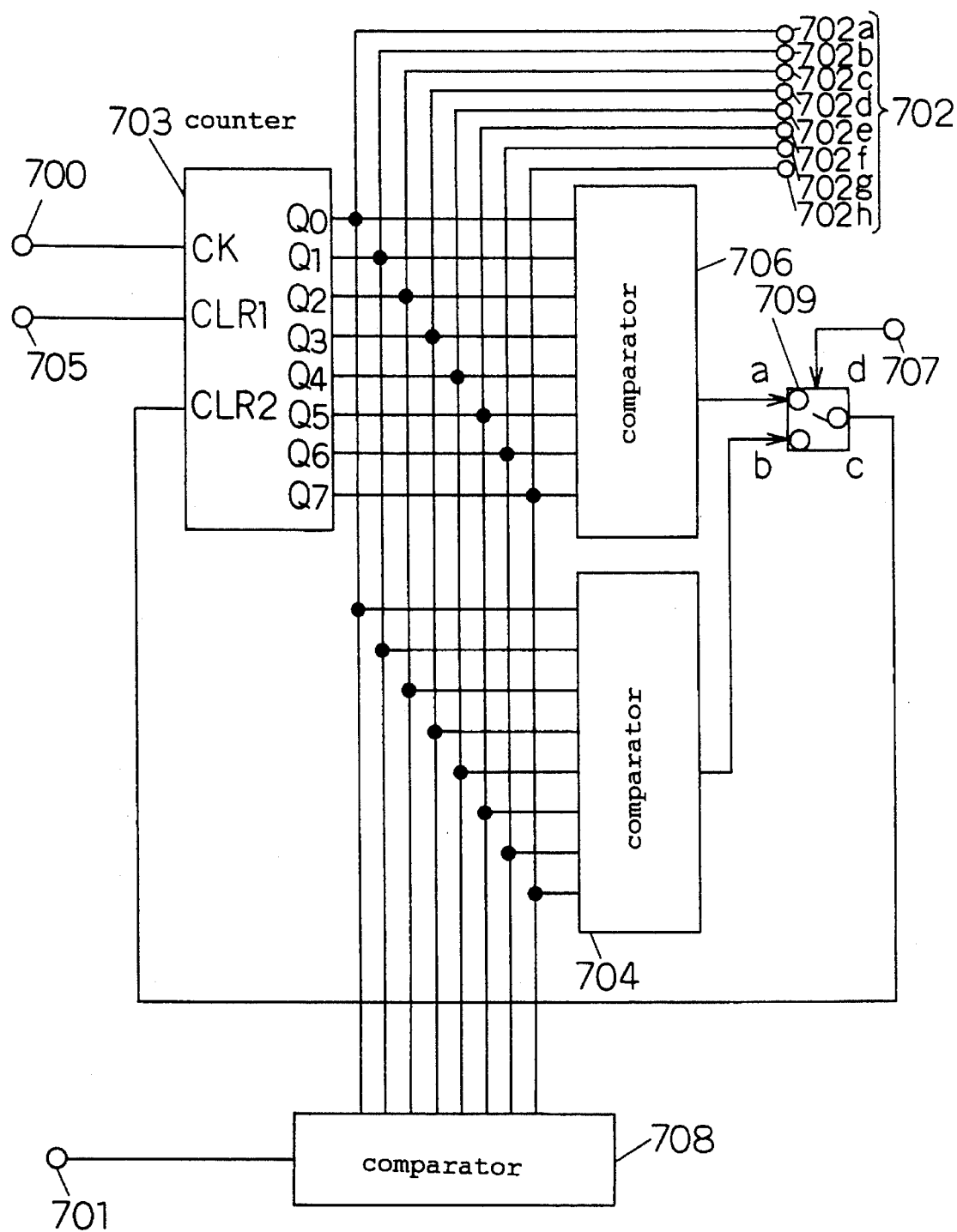
FIG. 12 is a block diagram of a frequency divider of the first embodiment.

FIG. 12 is a block diagram of the frequency divider 611. A terminal 700 is equivalent to the terminal (a) of the frequency divider 611 in FIG. 11, a terminal 701 to the terminal (c), a terminal 705 to the terminal (b) and a terminal 707 to the terminal (d), respectively. Terminals 702*a* through 702*h* are connected to the data bus line 616 in FIG. 11. A counter 703 is a 8 bit counter generally called as a synchronous counter in which a counting operation is carried out in synchronization with a leading edge of a clock input to a terminal CK. Q0 through Q7 represent counts; Q0 represents a lower bit and Q7 represents an upper bit. When a leading edge is input to the terminal CK when a terminal CLR2 is in high level, a count is cleared and when a terminal CLR1 is set at high level, the count is cleared regardless of the input of the signal to the terminal CK. The clock input to the terminal 700 is input to the terminal CK of the counter 703. A count of the counter 703 is input to the terminal 702 and comparators 704, 706 and 708. The comparator 706 outputs a high level when the inputted value is 21. The comparator 704 outputs a high level when the inputted value is 219. The comparator 708 outputs a high level when the inputted value is zero. An output of the comparator 708 is the divided pulse. A switch 709 connects terminals (b) and (c) when a terminal (d) is in low level and connects terminals (a) and (c) when the terminal (d) is in high level.

The operation of the frequency divider 611 will be explained with reference to the waveform chart in FIG. 4.

At first, the operation during the standby mode will be explained. A signal shown by the waveform (h) is input to the terminal 707. The waveform (h) is low level before time t1 during the standby mode. During the standby mode, a signal of the comparator 704 is input to the terminal CLR2 of the counter 703 via a switch 709. Accordingly, the counts Q0 through Q7 of the counter 703 repeat 0 through 219 corresponding to the clocks input to the terminal CK. Because the comparator 708 is arranged so that it outputs a high level when the input value is zero, the output of the comparator 708 is what the clock input to the terminal 700 is divided by 220. That is, when 4 kHz clock which is the output signal of the oscillator 130 is input to the terminal 600 in FIG. 11, the oscillation frequency of the VCO 610 of the PLL circuit 607 becomes 880 kHz which is a frequency of the clock for detecting UD.

Next, the operation carried out when the mode is shifted from the standby mode to the operation mode will be explained. When the UD area is detected, the level of the terminal 707 becomes high level (as shown in the waveform (h)). Then a signal of the comparator 706 is input to the terminal CLR2 of the counter 703 via the switch 709. Accordingly, the counts Q0 through Q7 of the counter 703 repeat 0 through 21 corresponding to clocks input to the terminal CK. Then the output of the comparator 708 is what the clock input to the terminal 700 is divided by 22. When the pulse P1 in the waveform (k), which is the clock mark signal, is input to the terminal 710 immediately after switching the switch 709, the count of the counter 703 is forced to clear. Accordingly, the divided pulse is synchronized with the position of clock mark on the disk.

Because 40 kHz clock signal (shown by the waveform (e)) which is the clock mark signal, is input to the terminal 600 of the timing clock generating circuit 119 shown in FIG. 11 after time t2, the oscillation frequency of the VCO 610 of the PLL circuit 607 becomes 880 kHz, which is the frequency of the reference clock signal. Further, the time when the count of the counter 703 is zero corresponds to the clock mark position and the leading edge of the clock of the VCO 610 is synchronized with the mark position on the disk.

Although the count of the frequency divider 611 is cleared to zero with the first clock mark signal after the detection of the UD area in the present embodiment, it is possible to provide a mark beforehand at a predetermined position between the end of the UD area and the clock mark to preset the count of the frequency divider 611 to a predetermined value with that mark. In this case, the divided pulse and the clock mark signal are synchronized with the preset timing.

Now an optical disk drive apparatus using a reference clock signal generator of a second embodiment of the present invention will be explained with reference to FIG. 13 which is a block diagram thereof. By the way, the same blocks with those in the first embodiment will be designated by the same reference numerals and explanation thereof will be omitted.

The disk 100 is mounted to the rotary shaft 102 of the motor 101 which is controlled so as to rotate at a predetermined speed of rotation by a motor control circuit 823.

A beam reflected from marks on the disk is read as a current by an optical pick-up 803 and is sent to the I/V converter 114. An output signal of the I/V converter 114 is sent to the tracking error detecting circuit 115 and the peak detecting circuit 133.

An output of the peak detecting circuit 133 is sent a terminal (b) of an AND gate 838 and a noise detecting circuit 840. A terminal (a) of the AND gate 838 is connected to a terminal (b) of a timing clock generating circuit 819. The timing clock generating circuit 819 outputs a gate signal for detecting clock mark which becomes high level during a period when clock marks exist from the terminal (b). Accordingly, an output signal of the AND gate 838 becomes a clock mark signal which corresponds to the clock mark. The clock mark signal becomes a signal in which pulses are output at a timing corresponding to the clock marks.

The timing clock generating circuit 819 includes a PLL circuit and generates a clock signal which is synchronized with the clock mark signal input to the terminal (a) and whose frequency is 1/M integer times of the frequency of the clock mark signal. The integer 1/M is set at a number of marks between the clock marks and a reference clock signal which is synchronized with the mark positions on the disk is generated by the PLL circuit. Further, the timing clock generating circuit 819 generates the gate signal for detecting clock mark and gate signals for detecting the first and second wobble marks 1006 and 1007 based on the reference clock signal generated by the PLL circuit. The tracking error detecting circuit 115 outputs a tracking error signal as explained in the first embodiment. This tracking error signal is sent to an optical pickup positioning mechanism 804 via a control circuit 816. Thereby a light beam spot is controlled so as to be positioned at the center of the track.

The noise detecting circuit 840 sends a high level signal to the terminal (c) of the timing clock generating circuit 819 and the control circuit 832 via an OR gate 849 when the peak detecting circuit 133 outputs pulses which correspond to the clock marks and pulses caused by noise in a period when the gate signal for detecting clock mark is in high level. The timing clock generating circuit 819 stops the operation of a phase comparator in the PLL circuit when the terminal (c) becomes high level.

As a result, the PLL circuit will not be influenced by the noise during the period when the gate signal for detecting clock mark is in high level and its operation will not become unstable.

An omitted clock mark detecting circuit 830 sends a high level signal to the control circuit 832 and the terminal (c) of the timing clock generating circuit 819 via an OR gate 849, when pulses are not present during the period when the gate signal for detecting clock mark sent from the terminal (b) of the timing clock generating circuit 819 is high level. Thereby, the PLL circuit will not erroneously operate even if no clock mark exists due to a mistake during production of the disk.

A memory circuit 839 stores controlled voltage of the VCO composing a part of the PLL circuit contained in the timing clock generating circuit 819 into a RAM (Random Access Memory) synchronizing with the reference clock signal across the period in which the disk rotates once. After the storage, it is read out of the RAM and is added to controlled voltage of the VCO similarly synchronizing with the reference clock signal.

The control circuit 832 sends a command of write operation to the memory circuit when the output signal of the OR gage 849 is always low level during the period in which the disk rotates once, i.e. when the clock marks are read adequately, and switches to a read operation for reading the stored controlled voltage thereafter. Accordingly, an unstable VCO controlled voltage when there exists no clock mark or there is noise may be prevented from being written into the RAM.

The value of the controlled voltage of the VCO stored in the RAM of the memory circuit 839 becomes a value of the controlled voltage of the VCO when the output signal of the VCO follows changes of frequency of the clock marks caused by eccentricity of the disk.

Accordingly, even if the operation of the phase comparator in the PLL circuit of the timing clock generating circuit 819 is stopped corresponding to the output signal of the OR gate 849 after switching to the read operation, the output signal of the VCO in the PLL circuit that follows the changes of frequency of the clock marks caused by the eccentricity of the disk may be obtained. That is, the output signal of the VCO in the PLL circuit is kept a state it almost agrees with the reference clock signal, allowing to open the gate signal for detecting clock mark assuredly at the next clock mark position.

Next the operation of the optical disk drive apparatus shown in FIG. 13 will be explained with reference to a waveform chart shown in FIG. 14. A typical diagram 14(a) is a diagram typically showing the array of the marks on the prior art disk shown in FIG. 1. A waveform (b) represents the output signal of the I/V converter 114, a waveform (c) the output signal of the peak detecting circuit 133, a waveform (d) the gate signal for detecting clock mark which is the output signal of the terminal (b) of the timing clock generating circuit 819, a waveform (e) the output signal of the terminal (d) of the timing clock generating circuit 819 which indicates an area of the first wobble mark, a waveform (f) the output signal of the output terminal (e) of the timing clock generating circuit 819 which indicates an area of the second wobble mark, a waveform (g) the output signal of the VCO in the PLL circuit contained in the timing clock generating circuit 819, a waveform (h) the output signal of the AND gate 838, a waveform (i) the output signal of the noise detecting circuit 840, a waveform (j) the output signal of the omitted clock mark detecting circuit 830, and a waveform (k) the output signal of the OR gate 849. Each waveform is a waveform when the PLL circuit operates stably. The disk 100 is the same one with that used in the first embodiment. However, in this case, there is a noise near the second clock mark from the left and the fourth clock mark from the left is omitted due to a mistake during production as shown in FIG. 14(a). In FIG. 14(a), the first and second wobble marks are disposed shifting above and under the center line (dotted line) by ¼ track in the figure. Further, the wobble marks and marks for data are formed on any of positions in an interval between the clock marks divided into 22 equal parts. Each position on the 22 equally divided part are named as zero-th bit to 21st bit and the clock mark is positioned at the zero-th bit, the second wobble mark at the third bit and the first wobble mark at the 19-th bit, respectively. Further, the bits from the zero-th bit to the 21st bit is grouped as one block and one track is composed of 1000 blocks. The clock marks are formed on the radial straight line originated from the center of the disk and as angles of the neighboring straight lines are all made equal, the clock marks are disposed periodically. By the way, as described before, the timing clock generating circuit 819 generates the reference clock signal synchronizing with the 0th bit to 21st bit when the disk rotates at a predetermined number of rotation.

When a light beam spot passes through on the disk as shown in FIG. 14(a), the level of the output waveform peaks at a mark as shown in the waveform (b). The peak detecting circuit 133 detects the peak positions and outputs a peak detection signal shown in the waveform (c). The output signal of the I/V converter 114 is also input to the tracking error detecting circuit 115 in the same time to carry out the tracking control corresponding to a difference of signal levels of the first and second wobble marks.

The gate signal for detecting clock mark shown by the waveform (d), the gate signal indicating the area of the first wobble mark shown by the waveform (e) and gate signal indicating the area of the second wobble mark shown by the waveform (f) are generated based on the output signal of the VCO in the PLL circuit shown by the waveform (g).

Because the output of the AND gate 838 is the pulse of the peak detection signal (shown by the waveform (c)) during the period when the gate signal for detecting clock mark is high level (as shown by the waveform (d)), it turns out to be a waveform shown by the waveform (h). Because only the pulse signal that corresponds to the clock mark exists during the period when the gate signal for detecting clock mark which is the first peak in the waveform (d) becomes high level, the output signal of the noise detecting circuit 840 shown by the waveform (i) becomes low level.

Because there are two pulse signals in total, i.e. the pulse that corresponds to the clock mark and a pulse k2 generated by the noise, in the period when the gate signal for detecting clock mark becomes high level in the second time, the output signal of the noise detecting circuit 840 becomes high level. When the signal having the waveform (h) is input to the omitted clock mark detecting circuit 830, because only the pulse signal that corresponds to the clock mark exists during the period when the gate signal for detecting clock mark (shown by the waveform (d)) becomes high level for the first time seeing from the left, the output signal of the omitted clock mark detecting circuit 830 becomes high level (as shown by the waveform (j)). Because there is no pulse which corresponds to the clock mark during the fourth period when the gate signal for detecting clock mark of the waveform (d) becomes high level, the output signal of the omitted clock mark detecting circuit 830 become high level. The output of the OR gate 849 shown by the waveform (k) becomes high level when the output signal of the noise detecting circuit 840 is high level or when the output signal of the omitted clock mark detecting circuit 830 is high level. Because the operation of the phase Comparator of the PLL circuit in the timing clock generating circuit 819 is stopped during the period when the output of the OR gate 849 is high level, the operation of the PLL circuit is kept stable even when pulses are generated due to noise or when there exist no clock mark.

Figure 15:
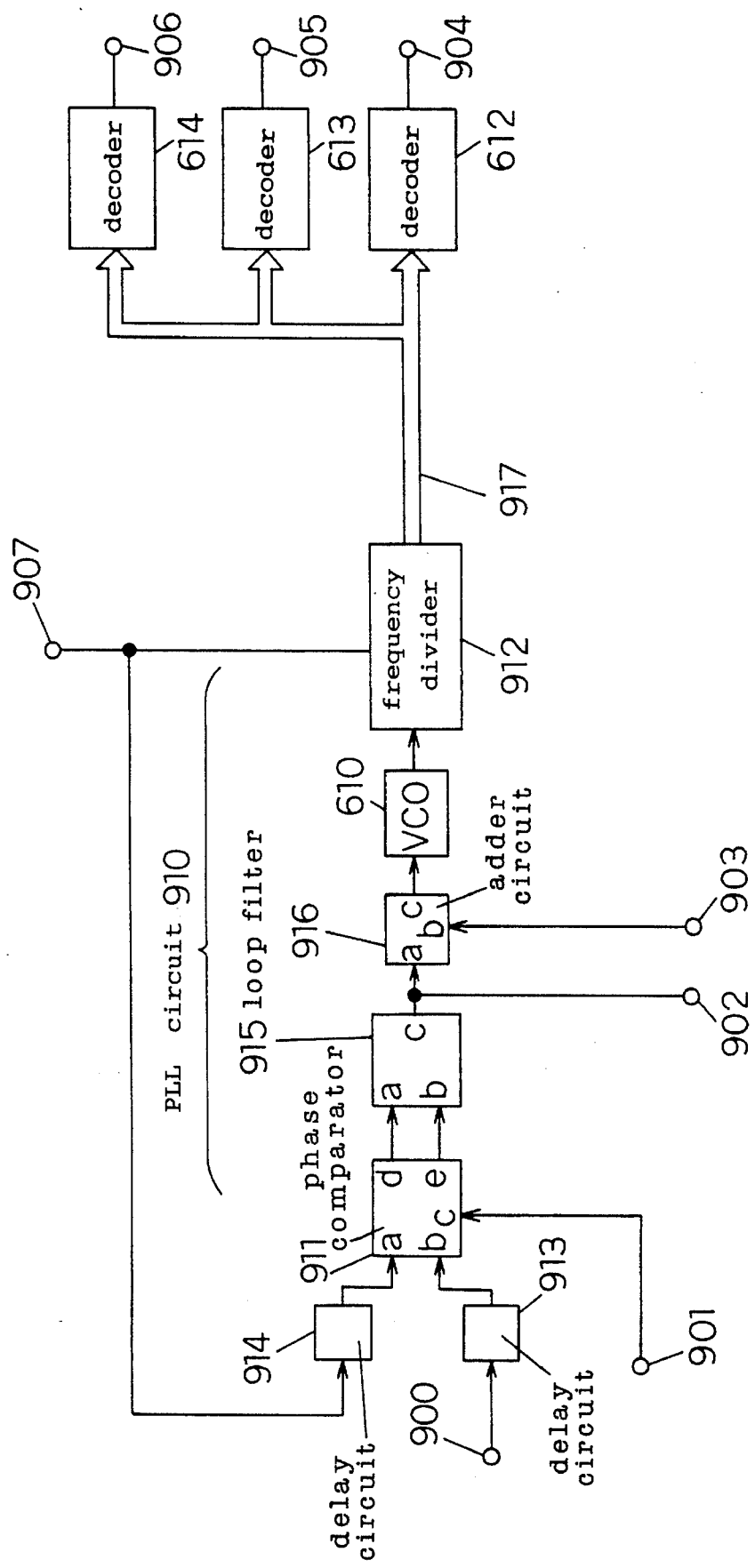
FIG. 15 is a block diagram of a timing clock generating circuit of the second embodiment.

Next, the operation of the timing clock generating circuit 819 will be explained based on FIG. 15. FIG. 15 is a block diagram of the timing clock generating circuit 819. The same blocks with those in the timing clock generating circuit 119 shown in FIG. 11 in the first embodiment will be denoted with the same reference numerals and explanation thereof will be omitted here. A terminal 900 is equivalent to the terminal (a) of the timing clock generating circuit 819, a terminal 902 to the terminal (g), a terminal 901 to the terminal (c), a terminal 907 to the terminal (f), a terminal 903 to the terminal (h), a terminal 904 to the terminal (b) a terminal 905 to the terminal (d) and a terminal 906 to the terminal (e), respectively.

The timing clock generating circuit 819 is provided with timing generating means, i.e. a PLL circuit 910. The PLL circuit 910 which is timing clock generating means generates the reference clock signal. Further, based on the reference clock signal, the gate signals for detecting the first and second wobble marks and gate signal for detecting clock mark are generated. The PLL circuit 910 ic comprised of a the phase comparator 911, VCO 610, frequency divider 912, delay circuits 913 and 914, loop filter 915 and adder circuit 916.

The frequency divider 912 divides a frequency of the output signal of the VCO 610 into 1/22 and sends the divided pulse to a terminal (a) of the phase comparator 911 and the terminal 907 via the delay circuit 914. The delay circuits 913 and 914 output by delaying the input signal for a predetermined time. By the way, the delay of the delay circuit 913 and 914 are adapted to be the same. The phase comparator 911 compares phases of a pulse input to the terminal (b) via the delay circuit 913 from the terminal 900 and a signal input to the terminal (a) and sends a phase difference signal which corresponds to a difference of phases of both signals to the loop filter 915. By the way, the phase comparator 911 is arranged so as to stop the phase comparing operation when a signal input to the terminal (c) from the terminal 901 is high level. The loop filter 915 adjusts transmission characteristics of the PLL circuit 910.

The output of the loop filter 915 is sent to the terminal 902 and the adder circuit 916. The adder circuit 916 adds the signals input to terminals (a) and (b) and sends the result to the VCO 610.

When level of the signal input to the terminal 903 is zero and the signal input to the terminal 901 is low level, the VCO 610 is controlled so that the pulse signal input to the terminal 900 is synchronized with the signal divided by the frequency divider 912, i.e. so that phases of the both signals match, because the delay amounts of the delay circuit 913 and 914 are set to be equal.

The operation of the PLL circuit 910 when level of the signal input to the terminal 903 is zero will be explained referring to a waveform chart shown in FIG. 16.

Figure 16:
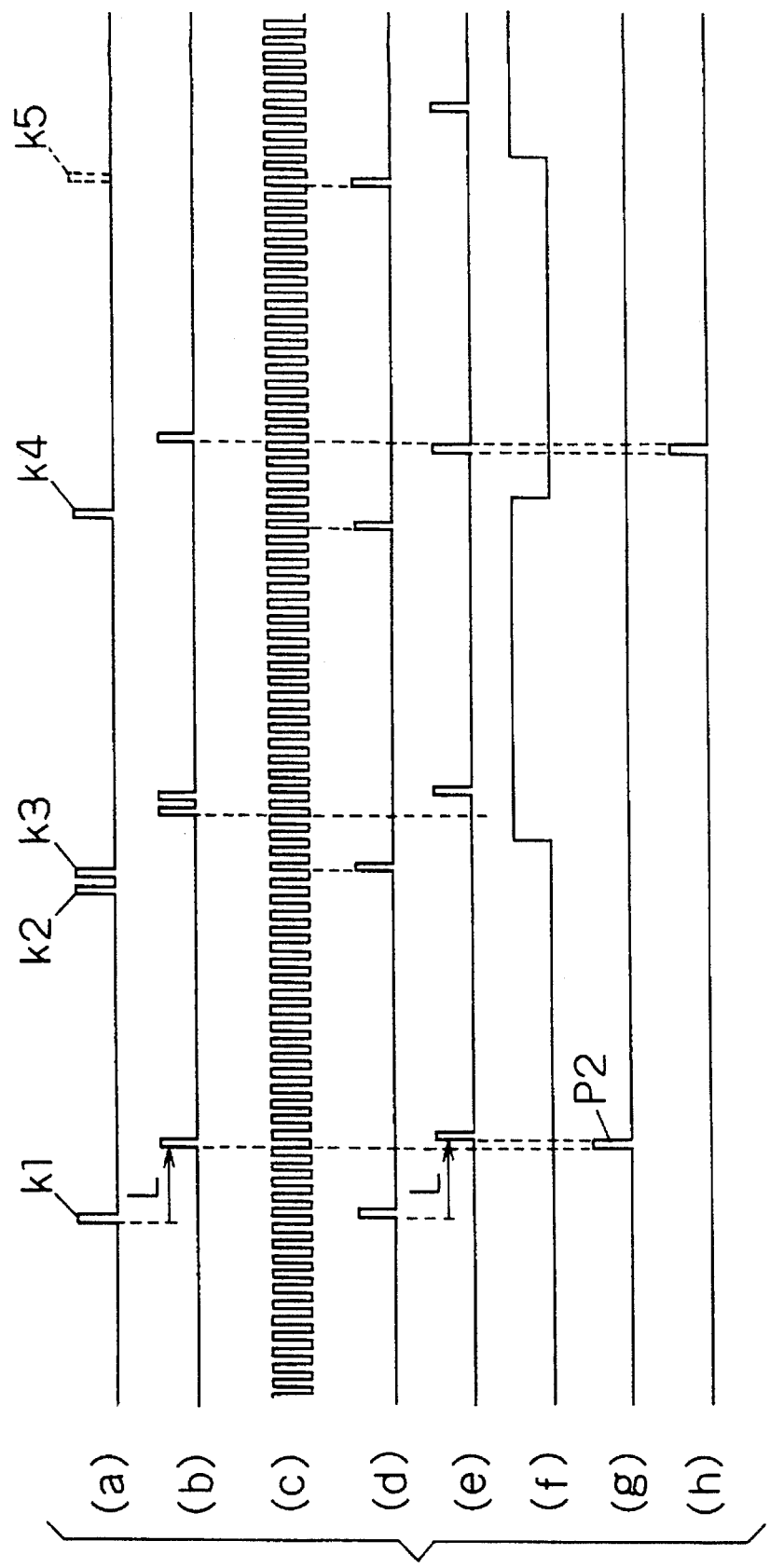
FIG. 16 is a waveform chart showing waveform of each section of the timing clock generating circuit of the second embodiment.

A waveform (a) in FIG. 16 is a waveform input to the terminal 900. It has the same form with the waveform (h) in FIG. 14. A waveform (b) represents the output signal of the delay circuit 913, a waveform (c) the output signal of the VCO 610, a waveform (d) the output signal of the frequency divider 912 sent to the delay circuit 914, and a waveform (e) the output signal of the delay circuit 914, respectively. A waveform (f) represents a waveform input to the terminal 901. It has the same form with the waveform (k) in FIG. 14.

Pulses k1, k3 and k4 in the waveform (a) represent pulses which correspond to clock marks. A pulse k2 is a pulse generated by noise. A pulse k5 which is drawn by dotted line shows a case when it is omitted due to a mistake during production. When the signal shown by the waveform (a) is input to the delay circuit 913, it is delayed by time L and turns out as shown by the waveform (b). The output signal of the frequency divider 912 sent to the delay circuit 914 turns out to be a signal having the waveform (d) which is a waveform the output signal of the VCO 610 (shown by the waveform (c)) is divided into 1/22. The output signal of the frequency divider 912 (shown by the waveform (d)) is delayed by the delay circuit 914 by time L and turns out to be a signal as shown by the waveform (e).

The signal of the waveform (e) is input to the terminal (a) of the phase comparator 911 and the signal of the waveform (b) is input to the terminal (b) thereof. The phase comparator 911 detects a difference of phases of the both signals. When the phase of the waveform (b) is in advance of the waveform (e), the terminal (d) becomes high level and when it is opposite, the terminal (e) becomes high level. However, the phase comparison operation is stopped during a period when level of the signal shown by the waveform (f) is high, and the terminals (d) and (e) become low level. Accordingly, the output of the phase comparator 911 turns out to be the waveforms (g) and (h). Because it is arranged so that the oscillation frequency of the VCO 610 becomes high when the waveform (g) is high level, the phase of the output signal of the frequency divider 912 advances by a high level signal P2 of the waveform (g). Accordingly, the VCO 610 will follow the pulses input to the terminal 900. That is, the output signal of the VCO 610 follows the reference clock signal.

Figure 17:
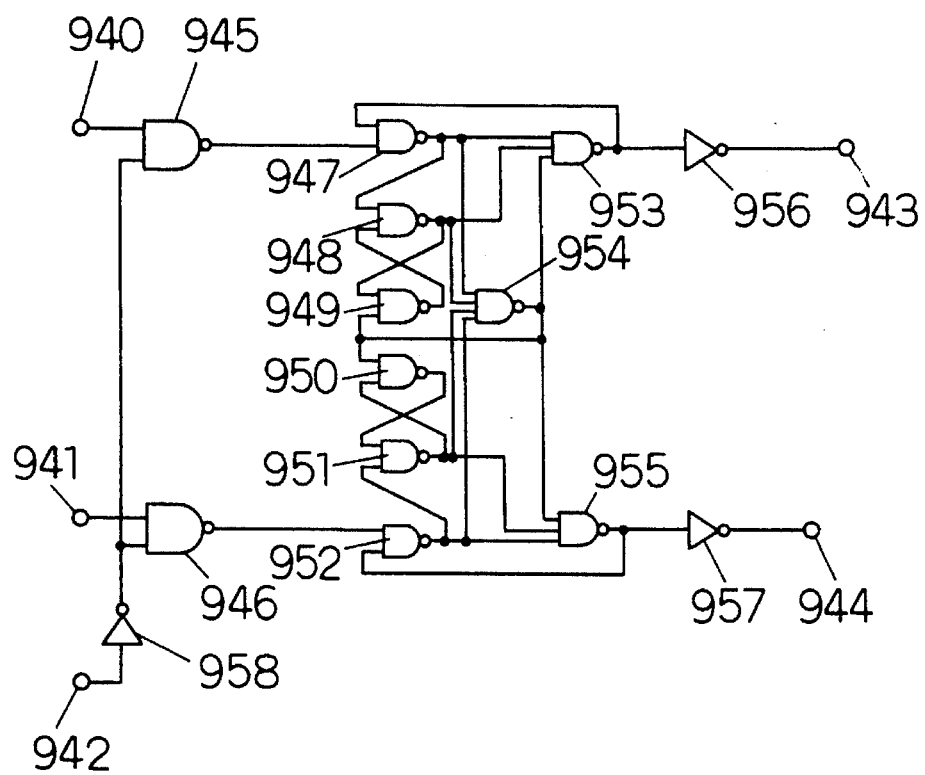
FIG. 17 is a block diagram of a phase comparator of the second embodiment.

Next, the phase comparator 911 will be explained based on FIG. 17 which shows a block diagram of the phase comparator 911.

A terminal 940 is equivalent to the terminal (b) of the phase comparator 911 shown in FIG. 15. A terminal 941 is equivalent to the terminal (a) of the phase comparator 911, a terminal 942 to the terminal (c), a terminal 943 to the terminal (d) and a terminal 944 to the terminal (e), respectively. The reference numerals (945 through 955) denote NAND gates and (956 and 957) denote inverters.

Figure 18:
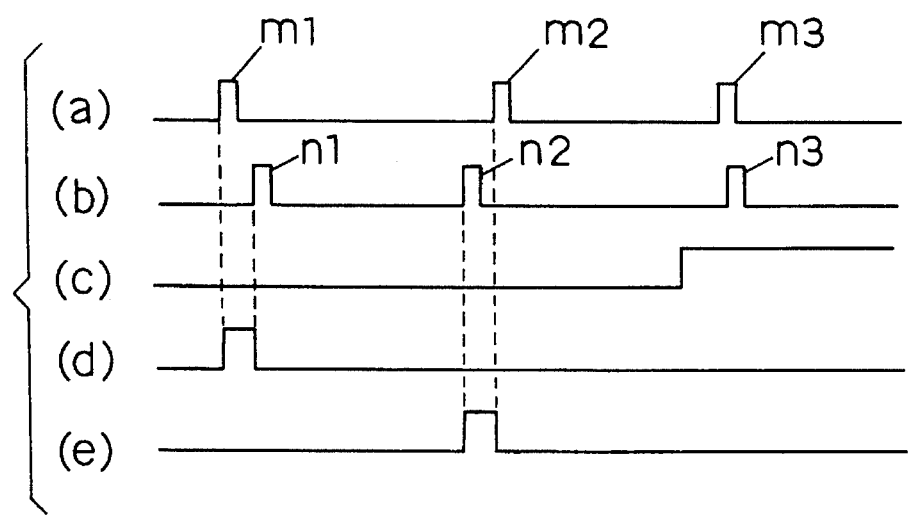
FIG. 18 is a waveform chart showing waveform of each section of the phase comparator of the second embodiment.

The operation of the phase comparator 911 will be explained with reference to a waveform chart shown in FIG. 18.

A waveform (a) represents a signal at the terminal 940, a waveform (b) a signal at the terminal 941, a waveform (c) a signal at the terminal 942, a waveform (d) a signal at the terminal 943 and a waveform (e) a signal at the terminal 944, respectively.

Because a phase of a pulse m1 of the waveform (a) is in advance of that of a pulse n1 of the waveform (b), the terminal 943 becomes high level during a period shown in the waveform (d). Further, because a phase of a pulse m2 of the waveform (a) is delayed as compare to that of a pulse n2 of the waveform (b), the terminal 944 becomes high level during a period shown in the waveform (e). Because the terminal 942 becomes high level during a period of a pulse m3 of the waveform (a) and n3 of the waveform (b), the AND gates 945 and 946 become low level and the phase comparison operation is stopped.

Figure 19:
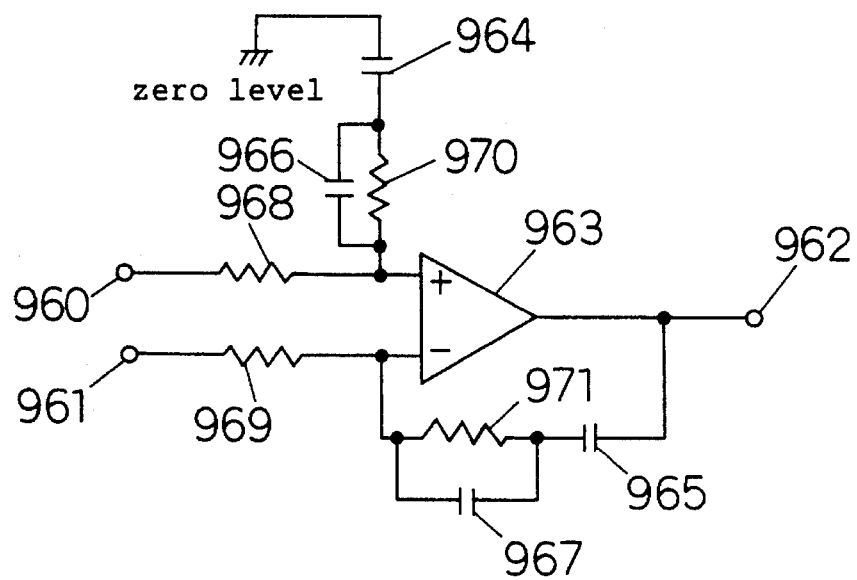
FIG. 19 is a block diagram of a loop filter of the second embodiment.

Next, the operation of the loop filter 915 will be explained based on FIG. 19 which shows a block diagram of the loop filter 915.

A terminal 961 is equivalent to the terminal (a) of the loop filter 915 shown in FIG. 15. Similarly, a terminal 961 is equivalent to the terminal (b) of the phase comparator 911 and a terminal 962 is equivalent to the terminal (c), respectively. The reference numeral (963) denotes a differential amplifier, (964, 965, 966, 967) capacitors, and (968 through 971) resistors.

Figure 20:
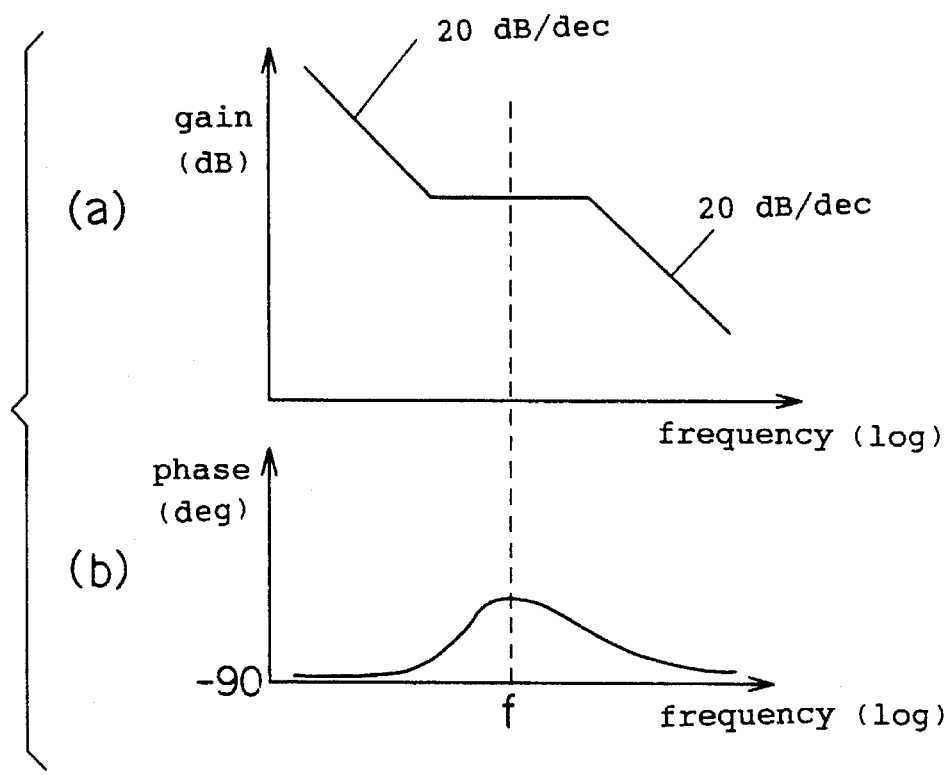
FIG. 20 is a board diagram of the loop filter of the second embodiment.

FIG. 20 shows one example of the transmission characteristics. In a characteristic diagram (a), a horizontal axis represents frequency and a vertical axis represents gain. In a characteristic diagram (b), a horizontal represents frequency and a vertical axis axis represents phase.

Values of the resistors 968 and 969 are adjusted taking a sensitivity and others of the VCO 610 into consideration to adjust the frequency (f) to become the intersection of gain of the PLL circuit 910. Accordingly, a sufficient phase margin can be obtained in an open loop characteristic of the PLL circuit 910, bringing about a stable characteristic.

An output of the differential amplifier 963 becomes plus, centering on zero level, when the terminal 960 becomes high level and minus when the terminal 961 becomes high level. Further, the VCO 610 is arranged so that it oscillates at a predetermined frequency when a control voltage is zero and so that its frequency becomes high when the control voltage becomes high and its frequency becomes low when the control voltage becomes low.

Figure 21:
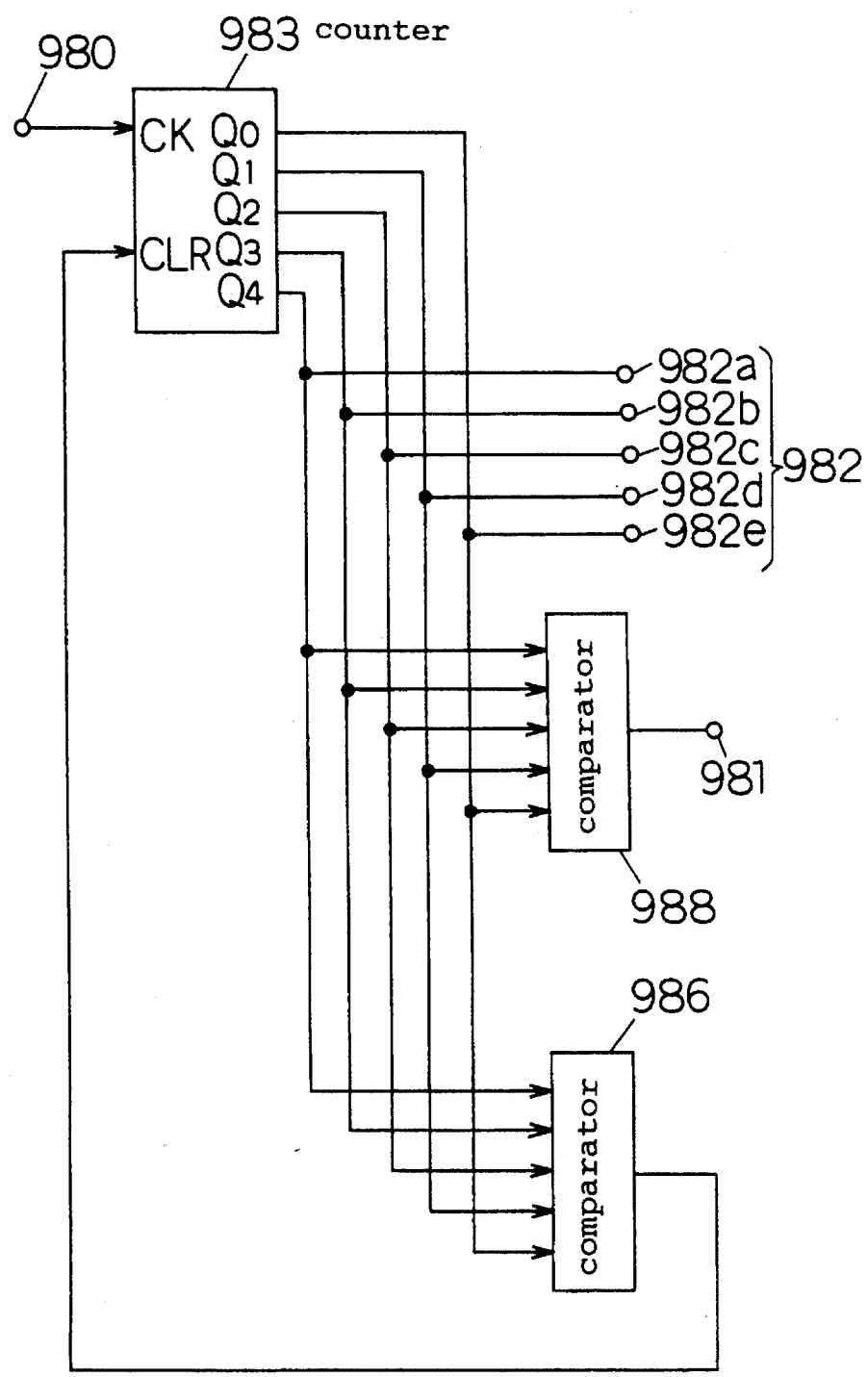
FIG. 21 is a block diagram of a frequency divider of the second embodiment.

Next, the operation of the frequency divider 912 will be explained based on FIG. 21. A terminal 980 is connected to the output terminal of the VCO 610 in FIG. 15. Similarly, a terminal 981 is connected to the delay circuit 914 and terminals 982*a* through 982*e* are connected to the data bus line 917, respectively. A counter 983 is a 5 bit counter generally called as a synchronous counter in which counting operation and clearing of counts are carried out in synchronization with leading edge of clocks input to a terminal CK. Q0 through Q4 represent counts. Q0 represents a lower bit and Q4 represents an upper bit.

When a leading edge is input to the terminal CK when a terminal CLR is high level, a count is cleared. Clocks input to the terminal 980 are input to the terminal CK. Counts of the counter 983 are input to the terminal 982 and comparators 986 and 988. The comparator 986 outputs high level when the inputted value is 21. The output signal of the comparator 986 is input to the terminal CLR of the counter 983. Accordingly, the counts Q0 through Q4 of the counter 983 repeat 0 through 21 corresponding to clocks input to the terminal CK. The comparator 988 is adapted so as to output high level when the inputted value is zero, so that the output of the comparator 988 is what a clock input to the terminal 980 is divided by 22.

Because pulses which correspond clock marks are input to the terminal 900 in FIG. 15 in a state when the PLL circuit 910 operates normally, the oscillation frequency of the VCO 610 in the PLL circuit 910 becomes equal to the frequency of reference clock signal. Further, a point of time when a count of the counter 983 becomes zero is synchronized with a center position of a clock mark. A leading edge of a clock of the VCO 610 is synchronized with a position of mark on the disk. That is, the count Q0 through Q4 of the counter 983 represent what correspond to time from the clock marks on the disk, i.e. angles of rotation of the disk.

Next, the operation of the noise detecting circuit 840 will be explained based on FIG. 22 which shows a block diagram of the noise detecting circuit 840.

Figure 13:
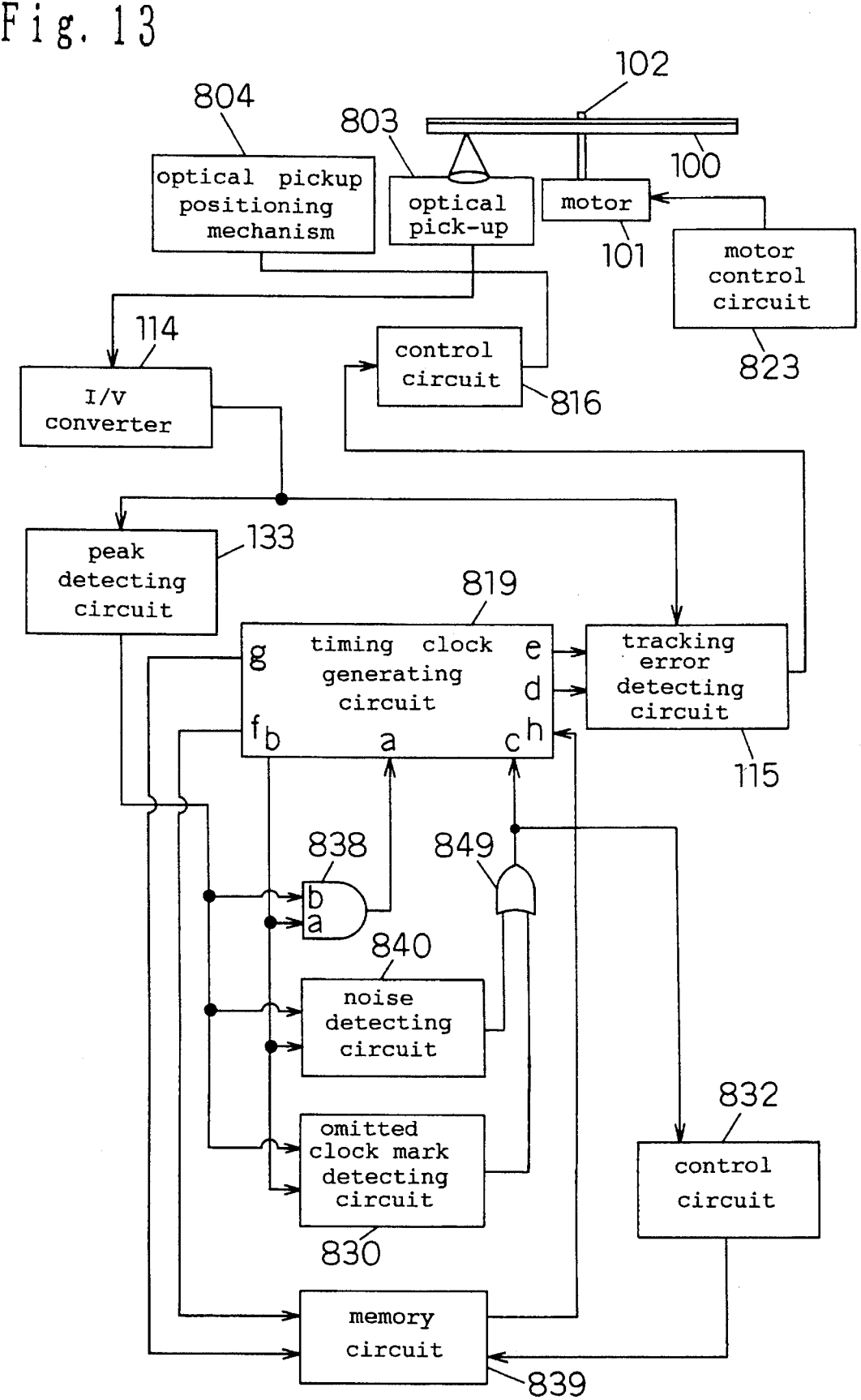
FIG. 13 is a block diagram of a reference clock signal generator of a second embodiment of the present invention.
Figure 14:
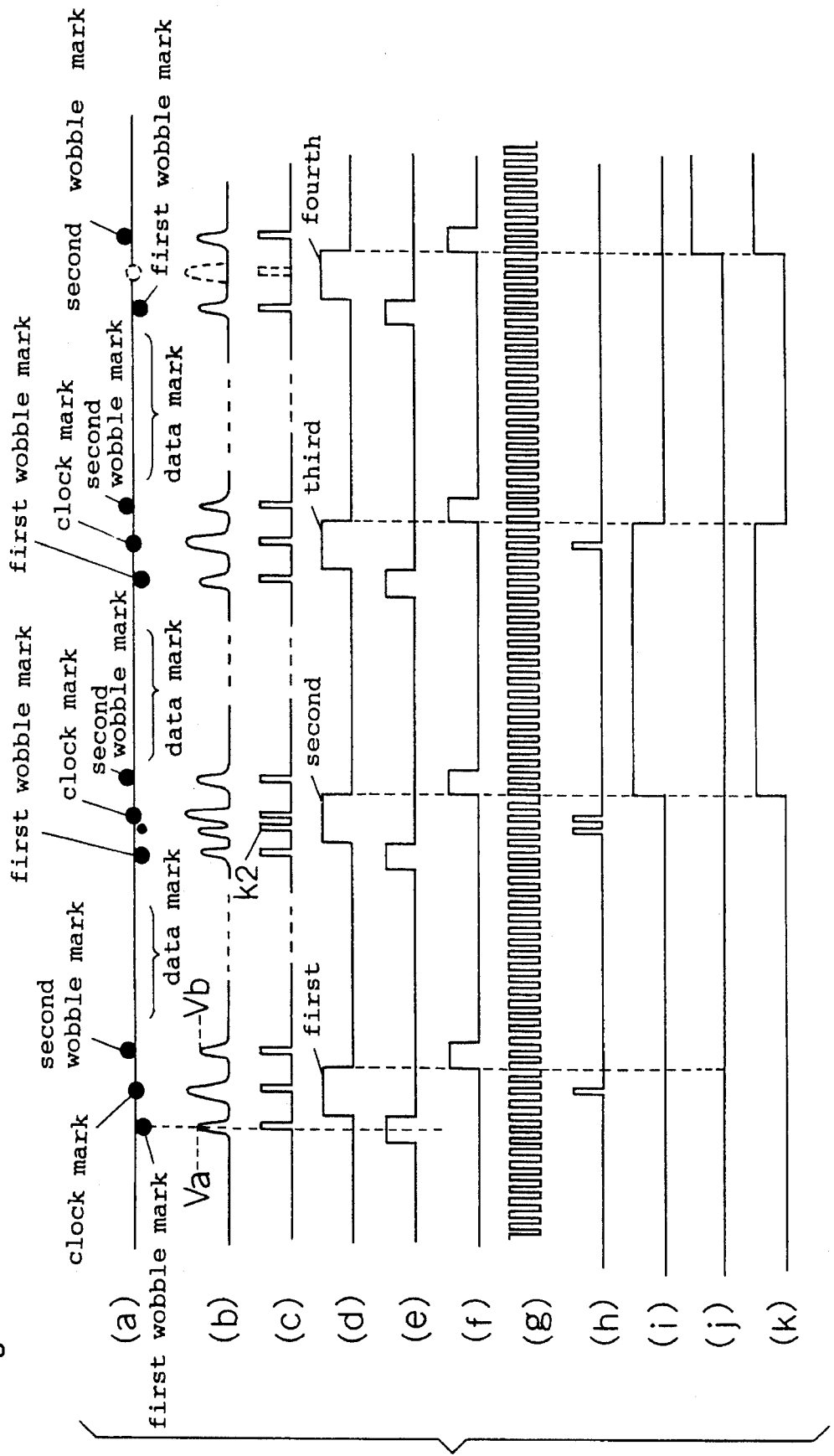
FIG. 14 is a waveform chart showing waveform of each section of the second embodiment.
Figure 22:
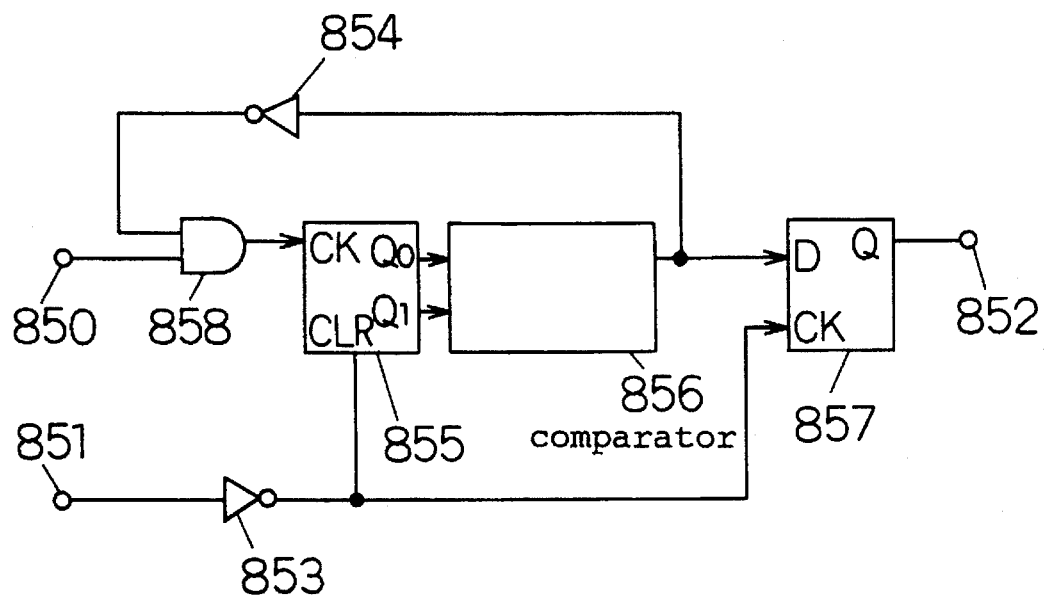
FIG. 22 is a block diagram of a noise detecting circuit of the second embodiment.

A terminal 850 in FIG. 22 is connected to the output terminal of the peak detecting circuit 133 in FIG. 13. Similarly, a terminal 851 is connected to the terminal (b) of the timing clock generating circuit 819. That is, the gate signal for detecting clock mark is input to the terminal 851.

A counter 855 is a 2 bit binary counter for counting leading edges of a signal input to a terminal CK. It stops counting and clears a count when a terminal CLR is high level. A counted value of the counter 855 is input to a comparator 856 which turns an output signal into high level when the inputted value is 2. When the output of the comparator 856 becomes high level, an input of an AND gate 858 is turned into low level via an inverter 854, so that the count of the counter 855 is remained to be 2. A flip-flop 857 latches a level of a terminal D into which the leading edge is input to a terminal CK and then outputs it.

Figure 23:
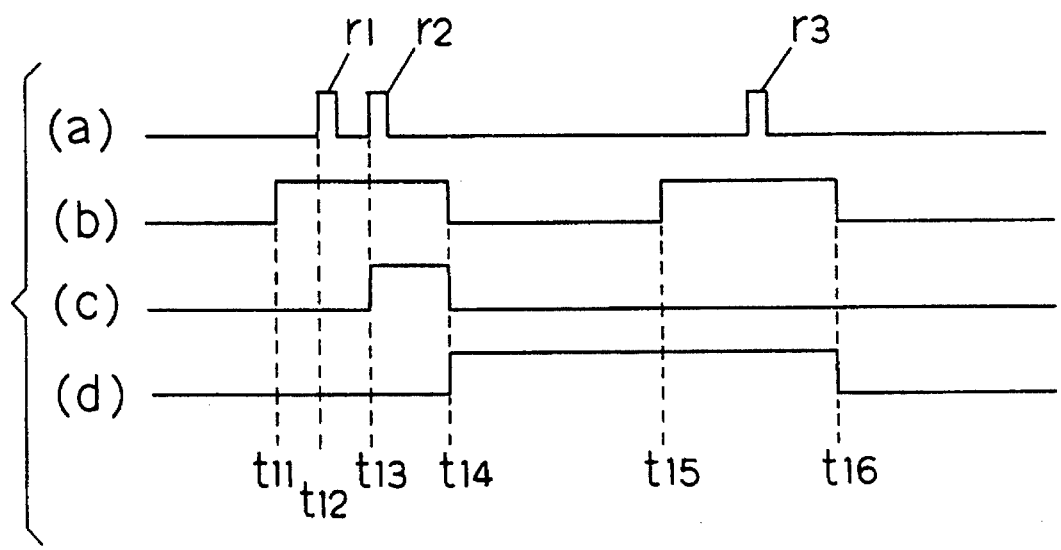
FIG. 23 is a waveform chart showing waveform of each section of the noise detecting circuit of the second embodiment.

The operation of the noise detecting circuit 840 will be explained based on a waveform chart shown in FIG. 23. A waveform (a) in FIG. 23 represents the peak detection signal input to the terminal 850. A waveform (b) represents the gate signal for detecting clock mark input to the terminal 851. A waveform (c) represents the output signal of the comparator 856 and waveform (d) represents a waveform at a terminal Q which is the output of the flip-flop 857, respectively. A horizontal axis thereof represents time.

When the gate signal for detecting clock mark shown by the waveform (b) becomes high level at time t11, the counter 855 starts its counting operation. Because a count of the counter 855 is zero at the time of t11, level of the output signal of the comparator 856 is low. Accordingly, the output of the AND gate 858 becomes the peak detection signal shown by the waveform (a) which is input to the terminal 850. The count of the counter 855 becomes 1 with a pulse r1 in the waveform (a) and becomes 2 with a pulse r2 at time t12. Accordingly, the output of the comparator 856 becomes high level at time t12 and the count of the comparator 855 is held at 2. When the gate signal for detecting clock mark shown by the waveform (b) becomes low level at time t14, the output signal of the comparator 856 is latched by the flip-flop 857. That is, a signal at the terminal 852 becomes high level at time t14 as shown by the waveform (d). Right after that, the counter 855 is cleared.

The counter 855 starts the counting operation again at time t15. Because only a pulse r3 exists during the period when the gate signal for detecting clock mark shown by the waveform (b) is high level, the signal of the terminal 852 becomes low level at time t16 when the gate signal for detecting clock mark shown by the waveform (b) becomes low level. As described above, the noise detecting circuit 840 can detect that more than two pulses have been input during the period when the gate signal for detecting clock mark is high level.

Next, the operation of the omitted clock mark detecting circuit 830 will be explained based on FIG. 24 which shows a block diagram of the omitted clock mark detecting circuit 830.

Figure 24:
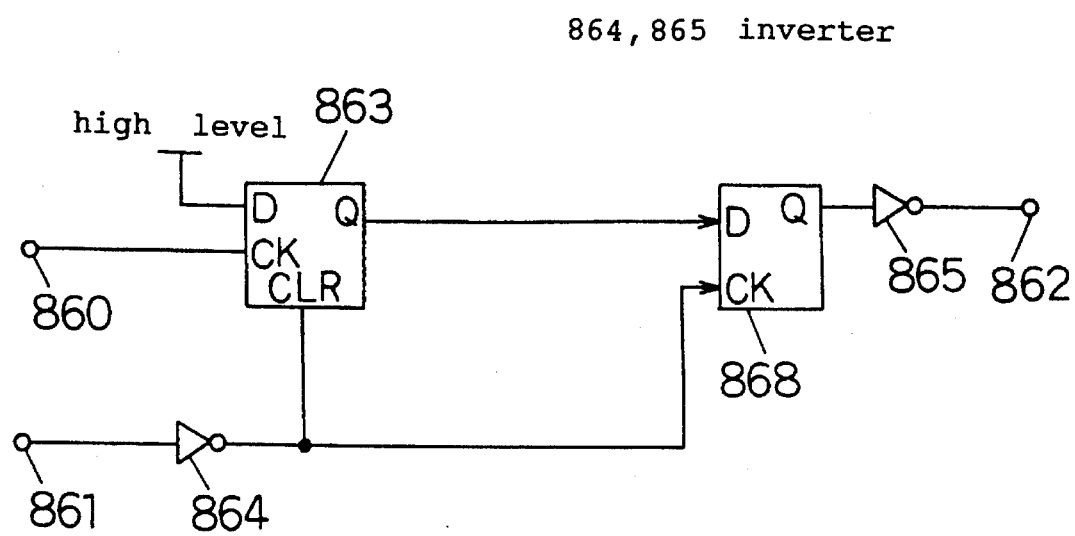
FIG. 24 is a block diagram of an omitted clock mark detecting circuit of the second embodiment.

A terminal 860 in FIG. 24 is connected to the output terminal of the peak detecting circuit 133 in FIG. 13 and a terminal 861 in FIG. 24 is connected to the terminal (b) of the timing clock generating circuit 819 in FIG. 13. That is, the gate signal for detecting clock mark is input to the terminal 861. A flip-flop 863 latches the high level signal of the terminal D and outputs it to the terminal Q when a leading edges of a signal is inputted to a terminal CK. A flip-flop 868 latches a level of a terminal D into which the leading edge is input to a terminal CK and then outputs it.

Figure 25:
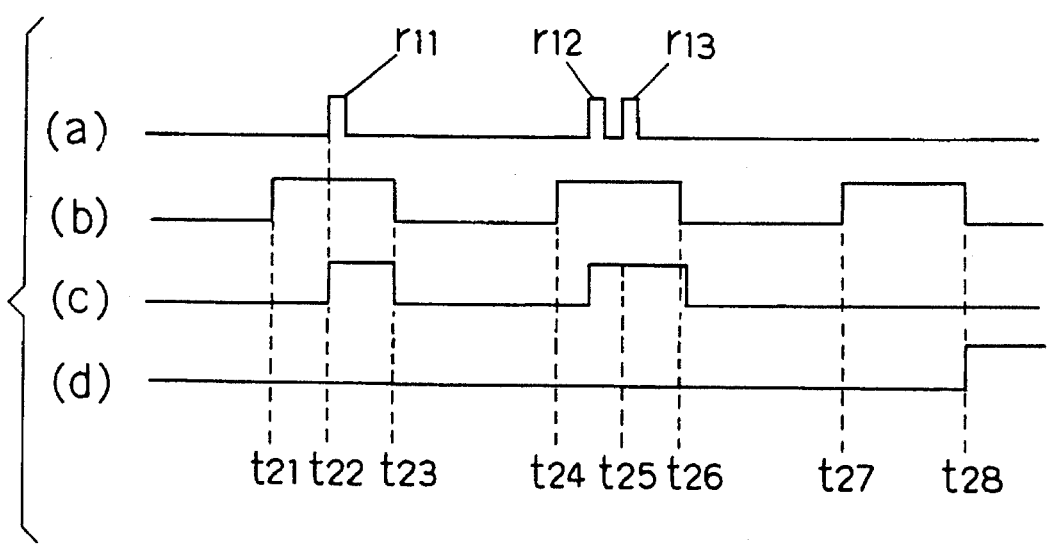
FIG. 25 is a waveform chart showing waveform of each section of the omitted clock mark detecting circuit of the second embodiment.

The operation of the omitted clock mark detecting circuit 830 will be explained based on a waveform chart shown in FIG. 25. A waveform (a) in FIG. 25 represents the peak detection signal input to the terminal 860. A waveform (b) represents the gate signal for detecting clock mark input to the terminal 861.

A waveform (c) represents the output signal of the flip-flop 863, and a waveform (d) a waveform at a terminal Q which is the output of the flip-flop 868, respectively. A horizontal axis thereof represents time.

When the gate signal for detecting clock mark shown by the waveform (b) becomes high level at time t21, the output of the flip-flop 863 becomes high with a pulse r11 in the waveform (a). When the gate signal for detecting clock mark shown by the waveform (b) becomes low level at time t23, the output signal of the flip-flop 863 is latched by the flip-flop 868. That is, a signal at the terminal 862 becomes low level at time t23 as shown by the waveform (d). Right after that, the flip-flop 863 is cleared. There exist two pulses, i.e. pulses r12 and r13, during the period from time t24 to time t26 when the gate signal for detecting clock mark is high level and therefore it operates as described above.

Because there exist no pulse during a period from time t27 to time t28 when the gate signal for detecting clock mark shown in the waveform (b) is high level, the flip-flop 863 remains to be low level. Accordingly, a signal at the terminal 862 becomes high level at time t28 when the gate signal for detecting clock mark shown by the waveform (b) becomes low level. As described above, the omitted clock mark detecting circuit 830 can detect that there is no pulse during the period when the gate signal for detecting clock mark shown by the waveform (b) is high level.

Figure 26:
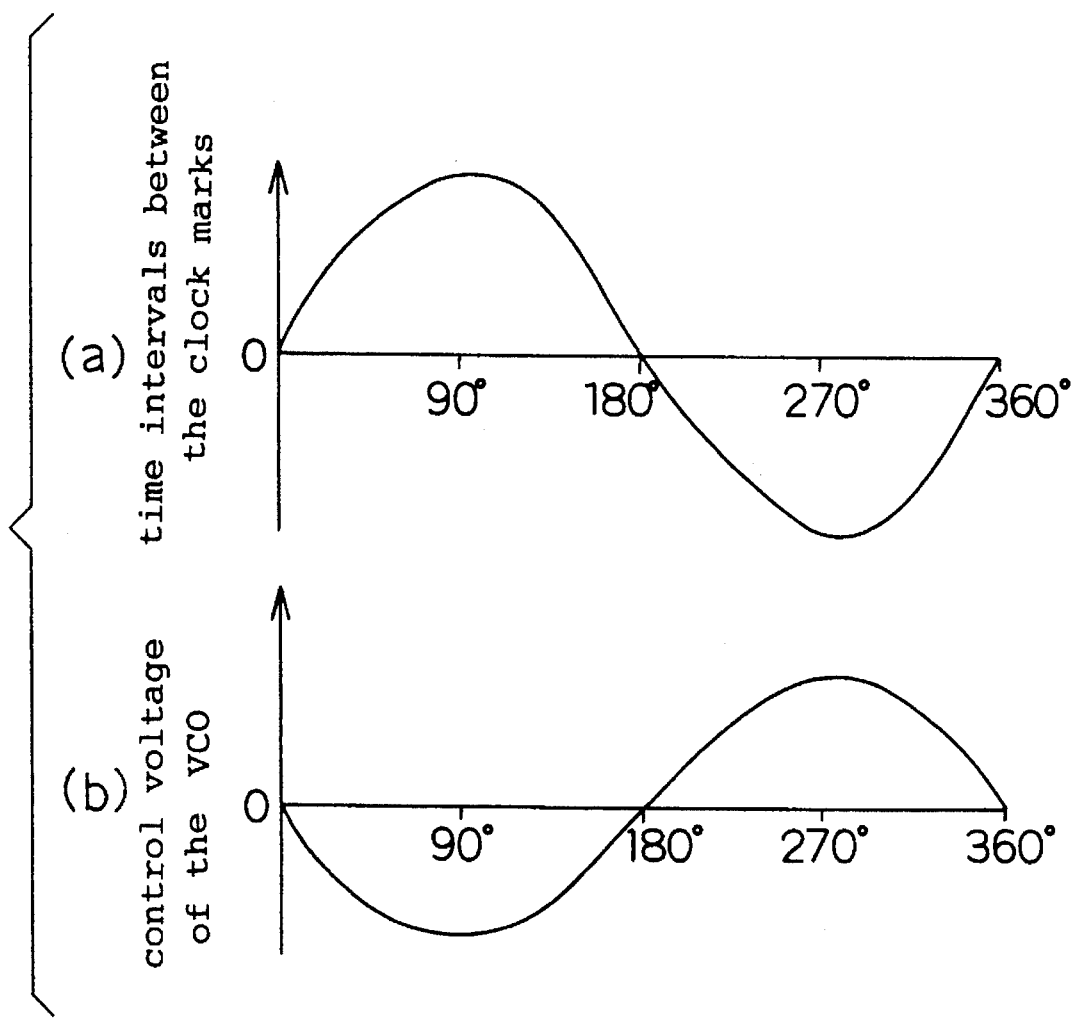
FIG. 26 is a waveform chart showing a relationship of a time interval of the clock marks and control voltage of a VCO of the second embodiment.

Next, the operation of the 839 will be explained based on FIG. 26.

Tracks are formed in spiral or cocentrically based on the center of the disk on the disk. Further, clock marks are formed on radial straight lines originated from the center of the disk and all the angles formed by the neighboring straight lines are made equal. Accordingly, time intervals between the clock marks are constant when the disk rotates with a constant number of rotation without having eccentricity by making the center of the disk coincide with the center of rotation.

However, the time intervals between the clock marks vary when the center of the disk deviates from the center of rotation due to a positional deviation or the like when the disk is mounted. FIG. 26(*a*) shows one example of the change of the time intervals between the clock marks when the disk is rotated with a constant number of rotation having an eccentricity. A horizontal axis represents angles of rotation and 360 degrees is one rotation. When the PLL circuit 910 operates normally, the control voltage of the VCO 610 in the PLL circuit 910 of the timing clock generating circuit 819 follows the changes of the time intervals between the clock marks shown by a waveform (a) and turns out to be a signal shown by a waveform (b).

Accordingly, it becomes possible for the control voltage which corresponds to the eccentricity to be input and the output signal of the VCO 610 to follow the changes of the time intervals between the clock marks caused by the eccentricity by storing the signal shown by the waveform (b) in the 839 and then by reading the stored control voltage in synchronization with the rotation of the disk to apply it to the control voltage of the VCO 610, even when a pulse is generated due to noise or the operation of the phase comparator 911 of the PLL circuit 910 is stopped when no clock mark exists. Further, a control accuracy may be improved by applying an eccentric error to the control voltage beforehand by always applying the stored control voltage, i.e. by implementing a feedforward control.

Next, the operation of the 839 will be explained based on FIG. 27 which shows a block diagram of the 839.

Figure 27:
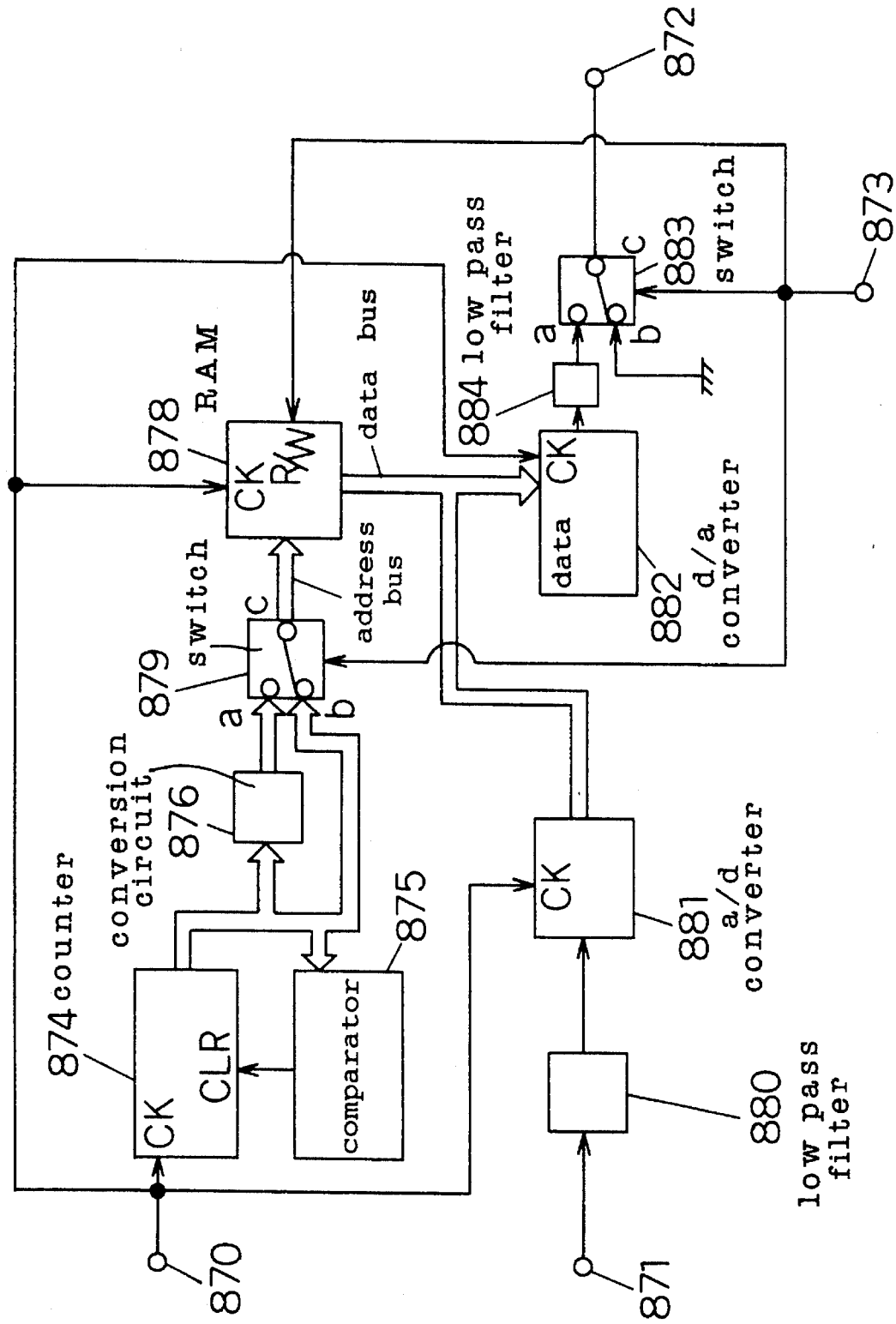
FIG. 27 is a block diagram of a memory circuit of the second embodiment.

Terminals 870, 871 and 872 in FIG. 27 are connected respectively to the terminals (f), (g) and (h) of the timing clock generating circuit 819 shown in FIG. 13. That is, the output Of the frequency divider 912 of the PLL circuit 910 is input to the terminal 870 and the output signal of the loop filter 915 of the PLL circuit 910 is input to the terminal 871. A terminal 873 in FIG. 27 is connected to the output terminal of the control circuit 832 in Pig. 13.

A counter 874 is a 10 bit counter generally called as a synchronous counter in which its counting operation and clearing of counted values are carried out in synchronization with leading edges of clocks input to a terminal CK thereof. Q0 through Q9 represent counted values. Q0 represents a lower bit and Q9 represents an upper bit. The count is cleared when a leading edge is input to the terminal CK when a terminal CLR is high level. Clocks input to the terminal 870 are input to the terminal CK of the counter 874 and its counted value is sent to a comparator 875. It is also sent to an address bus of a RAM 878 via a conversion circuit 876 and switch 879. The comparator 875 outputs high level when the inputted value is 999. The output signal of the comparator 875 is input to the terminal CLR of the counter 874. Accordingly, the counts Q0 through Q9 of the counter 874 repeat 0 through 999 corresponding to the clocks input to the terminal CK. One track is composed of 1000 blocks in the disk used in the present embodiment. That is, there exist 1000 clock marks in one track.

By the way, the output of the frequency divider 912 of the PLL circuit 910 input to the terminal 870 is synchronized with the clock marks and interpolates a pulse almost at the very position when the clock mark is not formed due to a mistake during production. Accordingly, the count of the counter 874 indicates a rotational position of the disk and a period in which the counts change from 0 to 999 indicates a period in which the disk rotates once. A low pass filter 880 removes a frequency component which is higher than a component of rotation frequency of the disk from the signal input to the terminal 871.

An A/D converter 881 converts the output signal of the low pass filter 880 into a digital signal. An input terminal of a D/A converter 882 is connected to a data bus of the RAM 878. The D/A converter 882 converts the digital signal to an analog signal to send to a switch 883 via a low pass filter 884.

An operation for writing the signal input to the terminal 871 into the RAM 878 will be explained. During the writing operation, terminals (b) and (c) are connected in a switch 879, terminals (b) and (c) are connected in the switch 883 and the RAM 878 is set in the write mode. By the way, because the terminal (b) of the switch 883 is set at zero level, it will not affect the loop of the PLL circuit 910.

Figure 28:
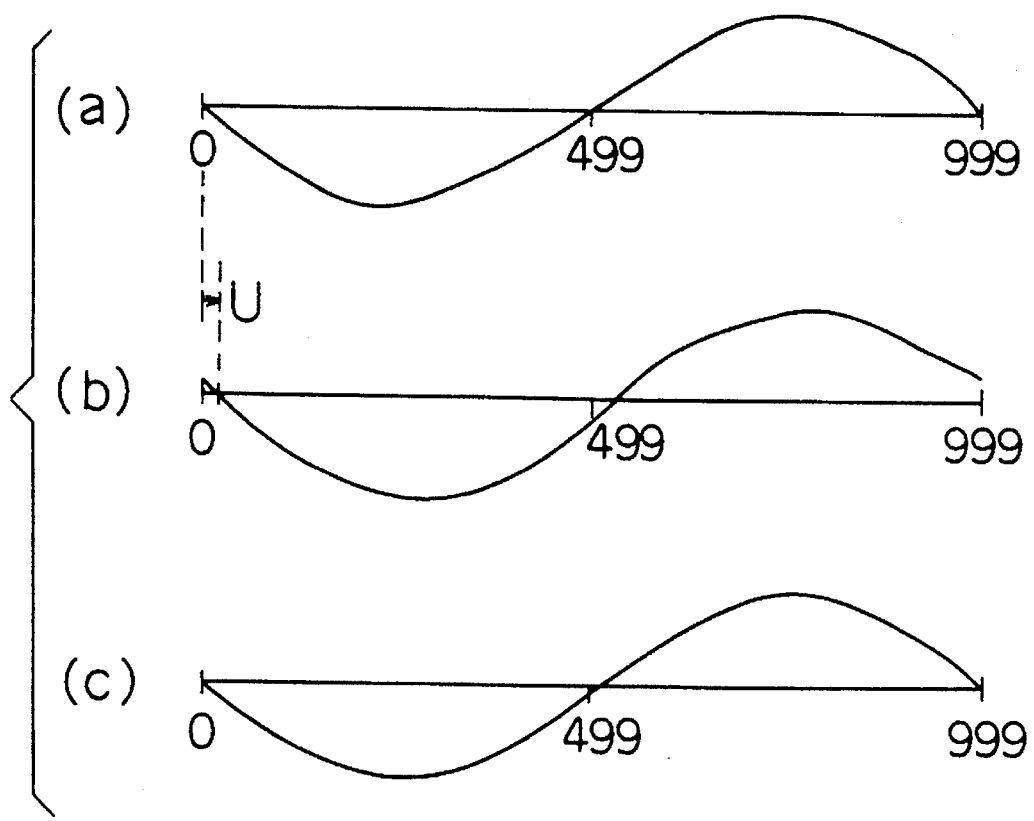
FIG. 28 is a waveform chart for explaining operations of the memory circuit of the second embodiment.

A waveform (a) in FIG. 28 shows one example of the relationship between the counts of the counter 874 and the signal input to the terminal 871. A horizontal axis represents the counts of the counter 874 and a vertical axis represents level of the signal input to the terminal 871. The signal shown by the waveform (a) is converted into a digital value by the A/D converter 881 via the low pass filter 880. The converted digital value is then written into an address of the RAM 878 which corresponds to the value of the counter 874. By the way, a delay lag is brought about by the low pass filter 880 and the value written into the RAM 878 becomes a value shown by a waveform (b). The control circuit 832 switches the mode to the read mode when the write operation is carried out for a period in which the disk rotates more than once.

Now an operation for reading out the value written into the RAM 878 will be explained. During the read operation, the terminals (a) and (c) are connected in the switch 879, the terminals (a) and (c) are connected in the switch 883 and the RAM 878 is set in the read mode by the control circuit 832.

Because the value written into the RAM 878 is the value in which the phase lag is brought about by the low pass filter 880 (the waveform (b)), an address to be read is shifted by the conversion circuit 876 in reading it out. That is, when the count of the counter 874 is zero, a value at address U is read out. Thereby the signal at the terminal 872 turns out to be a waveform (c) which is almost equal to the waveform (a). By the way, the low pass filter 884 is a filter for removing high frequency noise.

Figure 29:
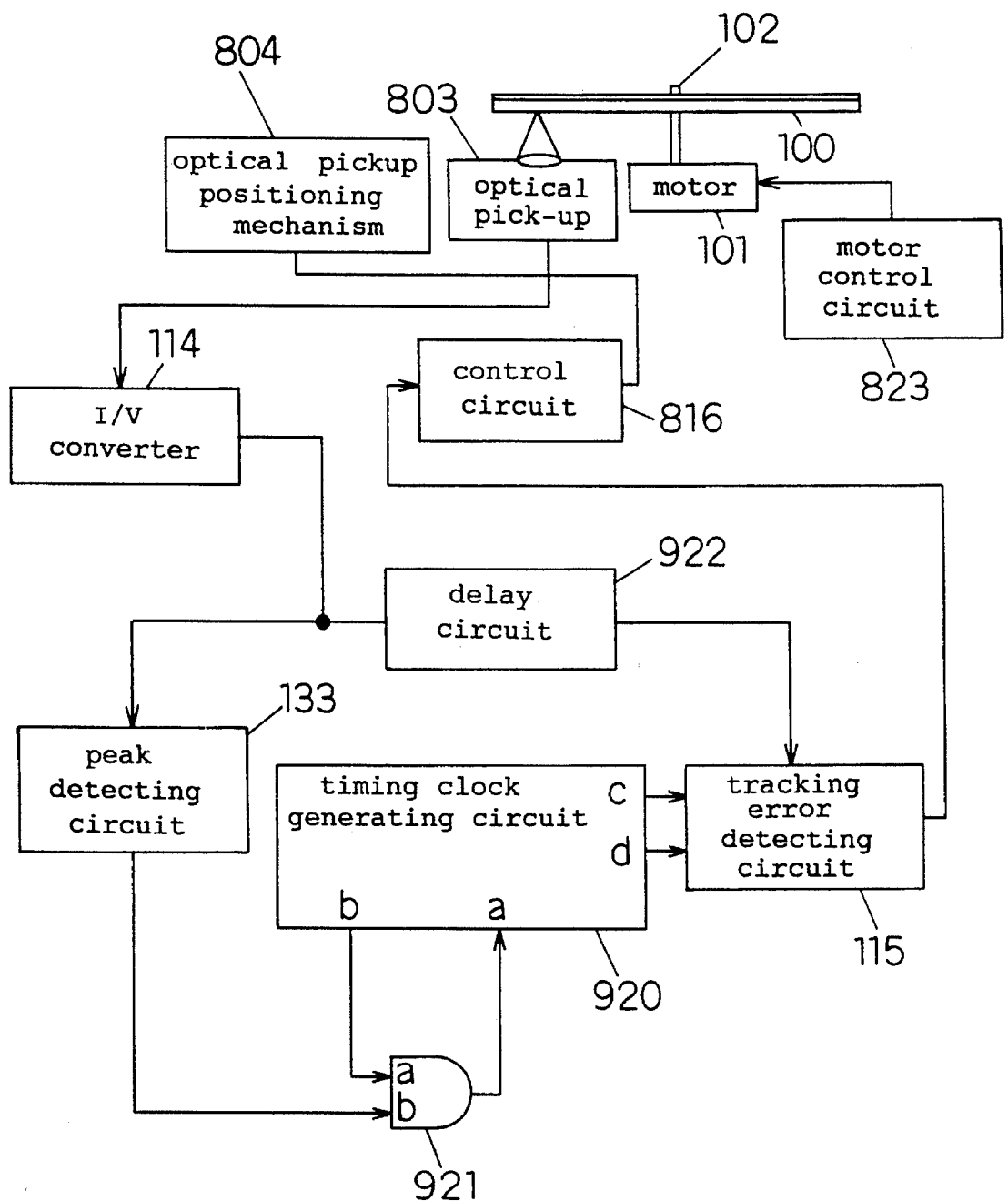
FIG. 29 is a block diagram of an optical disk unit according to a third embodiment of the present invention.

Now an optical disk unit according to a third embodiment of the present invention will be explained with reference to FIG. 29 which is a block diagram thereof. The same reference numerals denote the same blocks with those in the first or second embodiments and explanation there will be omitted.

A beam reflected by marks on the disk is read as a current by an optical pickup 803 and is sent to the I/V converter 114.

The output signal of the I/V converter 114 is then sent to a delay circuit 922 and the peak detecting circuit 133. The delay circuit 922 delays the input signal for a predetermined time and outputs to the tracking error detecting circuit 115. The output of the peak detecting circuit 133 is sent to a terminal (b) of an AND gate 921. A gate signal for detecting clock mark is sent from a terminal (b) of a timing clock generating circuit 920 to a terminal (a) of the AND gate 921. Therefore, the output of the AND gate 921 becomes a clock mark signal. The clock mark signal is sent to a terminal (a) of the timing clock generating circuit 920. The timing clock generating circuit 920 contains a PLL circuit which synchronizes with the clock signal input to the terminal (a) of the timing clock generating circuit 920 to generate a clock signal having 22 times of frequency of that clock signal. The timing clock generating circuit 920 also outputs gate signals for detecting first and second wobble marks from terminals (c) and (d). The tracking error detecting circuit 115 detects a tracking error signal from the output waveform of the delay circuit 922 using the gate signals for detecting the first and second wobble marks.

Figure 30:
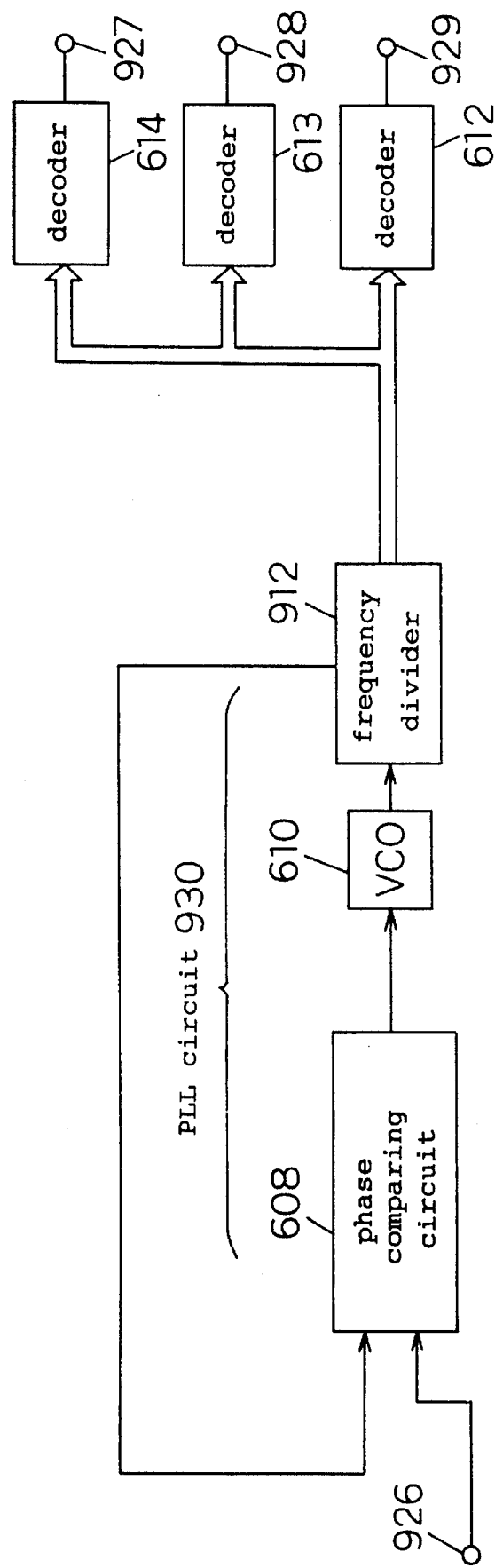
FIG. 30 is block diagram of a timing clock generating circuit of the third embodiment.

The timing clock generating circuit 920 will be explained with reference to FIG. 30. A terminal 920 equivalent to the terminal (a) of the timing clock generating circuit 920 in FIG. 29, a terminal 927 to the terminal (c), a terminal 928 to the terminal (d) and a terminal 929 to the terminal (b), respectively.

The same reference numerals are designated to the same blocks with those in the timing clock generating circuit 119 in the first embodiment (whose block diagram is shown in FIG. 11). Further, the same reference numerals are designated to the same blocks with those in the timing clock generating circuit 819 in the second embodiment (whose block diagram is shown in FIG. 15). A block which is different from those in the timing clock generating circuit 119 in the first embodiment is a frequency divider 912. However, the frequency divider 912 is the same one with that used in the timing clock generating circuit 819 in the second embodiment. Accordingly, the 930 synchronizes with the clock mark signal input to the terminal 920 and generates a clock signal having 22 times of frequency of that.

Figure 31:
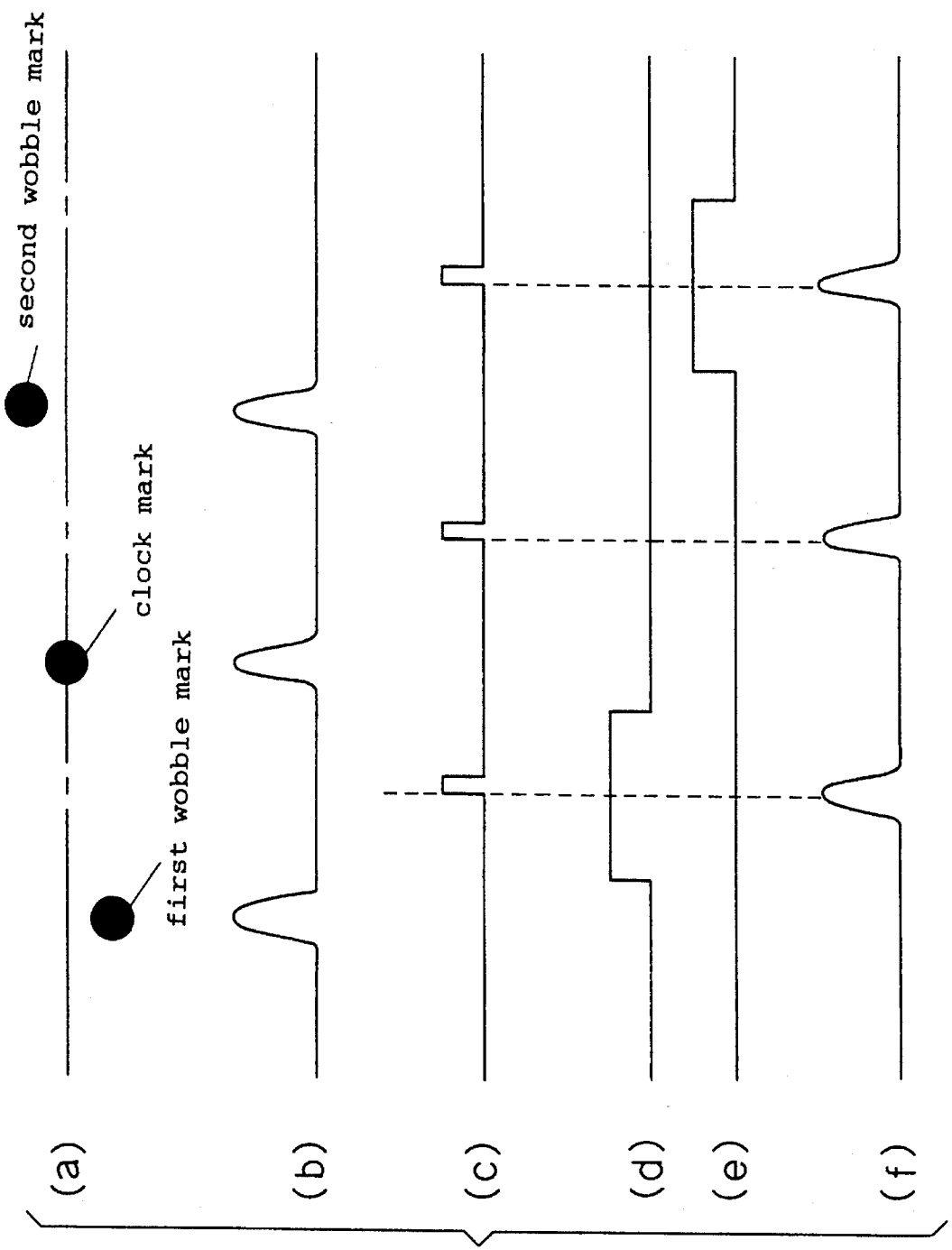
FIG. 31 is a waveform chart for explaining operations of the optical disk drive apparatus of the third embodiment.

The operation of the optical disk drive apparatus shown in FIG. 29 will be explained using FIG. 31.

FIG. 31(a) is a diagram typically showing the array of the marks on the disk shown in FIG. 1. A waveform (b) represents the output of the I/V converter 114, a waveform (c) the output of the peak detecting circuit 133, a waveform (d) the output signal at the terminal (c) of the timing clock generating circuit 920 which is the gate signal for detecting the first wobble mark, a waveform (e) the output signal at the terminal (d) of the timing clock generating circuit 920 which is the gate signal for detecting the second wobble mark and a waveform (f) the output waveform of the delay circuit 922, respectively.

Although it has been described in the first embodiment that a leading edge of a peak detection signal coincides with a center position of a mark, the leading edge of the peak detection signal may deviate depending on a processing speed of the peak detecting circuit 133. The waveform (c) shows a case when it is delayed by time D. In this case, a clock mark signal which is delayed from a clock mark by time D is input to the terminal (a) of the timing clock generating circuit 920. Accordingly, the timing clock generating circuit 920 operates synchronizing with the clock mark signal which is delayed by time D. Due to that, the gate signals for detecting the first and second wobble marks similarly delay by time D. If the gate signals for detecting wobble marks delay by time D, they cannot detect the wobble marks correctly and the tracking error signal becomes incorrect. Then, a delay time of the delay circuit 922 is set at time D and the signal of the delay circuit 922 shown by the waveform (f) is used to allow to detect a tracking error signal correctly.

Now an optical disk unit according to a fourth embodiment of the present invention will be explained with reference to FIG. 32 which is a block diagram thereof. The same reference numerals are designated to the same blocks with those in the third embodiment and explanation thereof will be omitted. What is different from the third embodiment is that the delay circuit 922 is eliminated and in contrary, a delay circuit 951 is added and that a construction of a timing clock generating circuit 952 is different.

Figure 33:
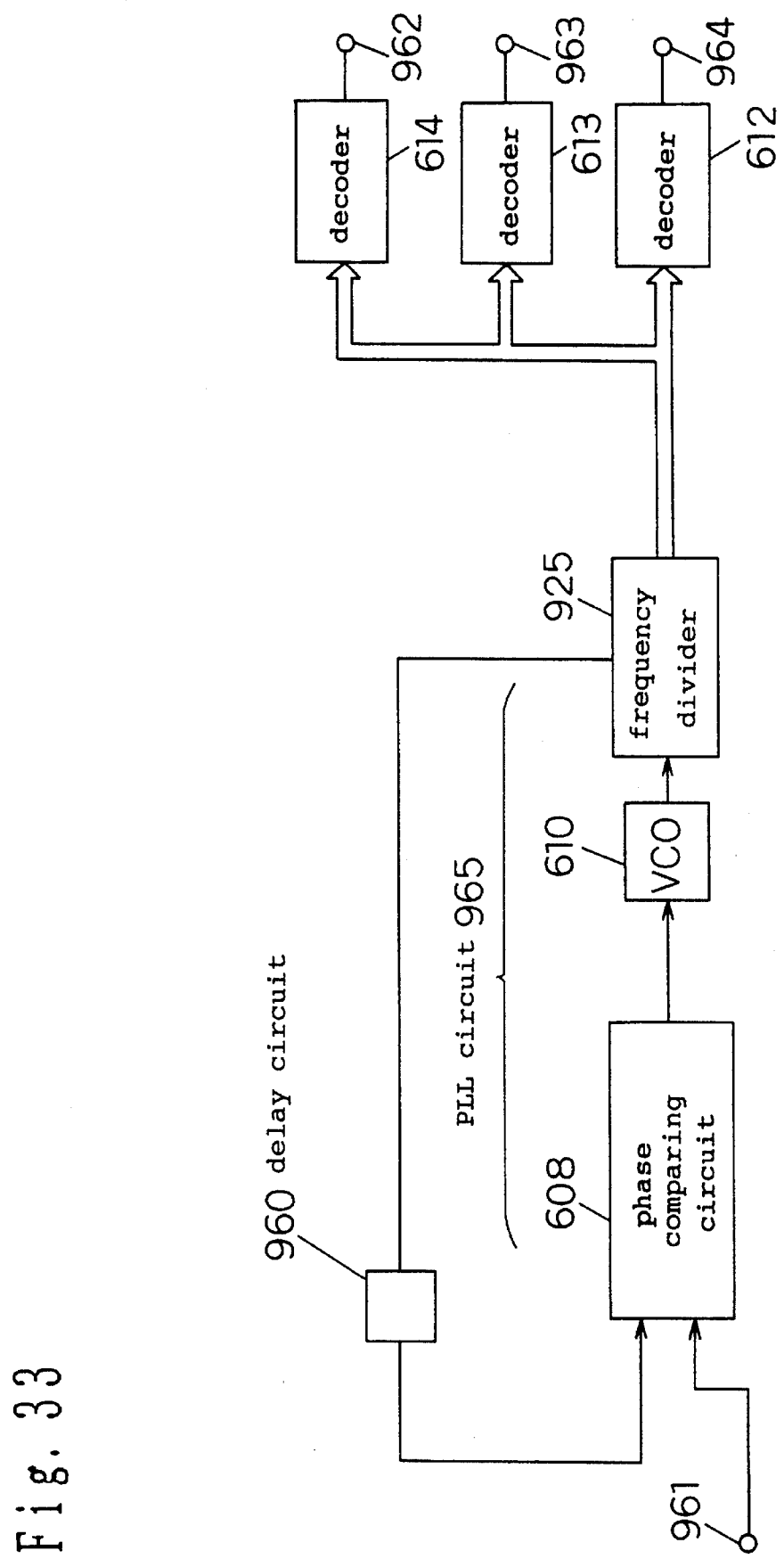
FIG. 33 is block diagram of a timing clock generating circuit of the fourth embodiment.

The timing clock generating circuit 952 will be explained using a block diagram thereof shown in FIG. 33.

Figure 32:
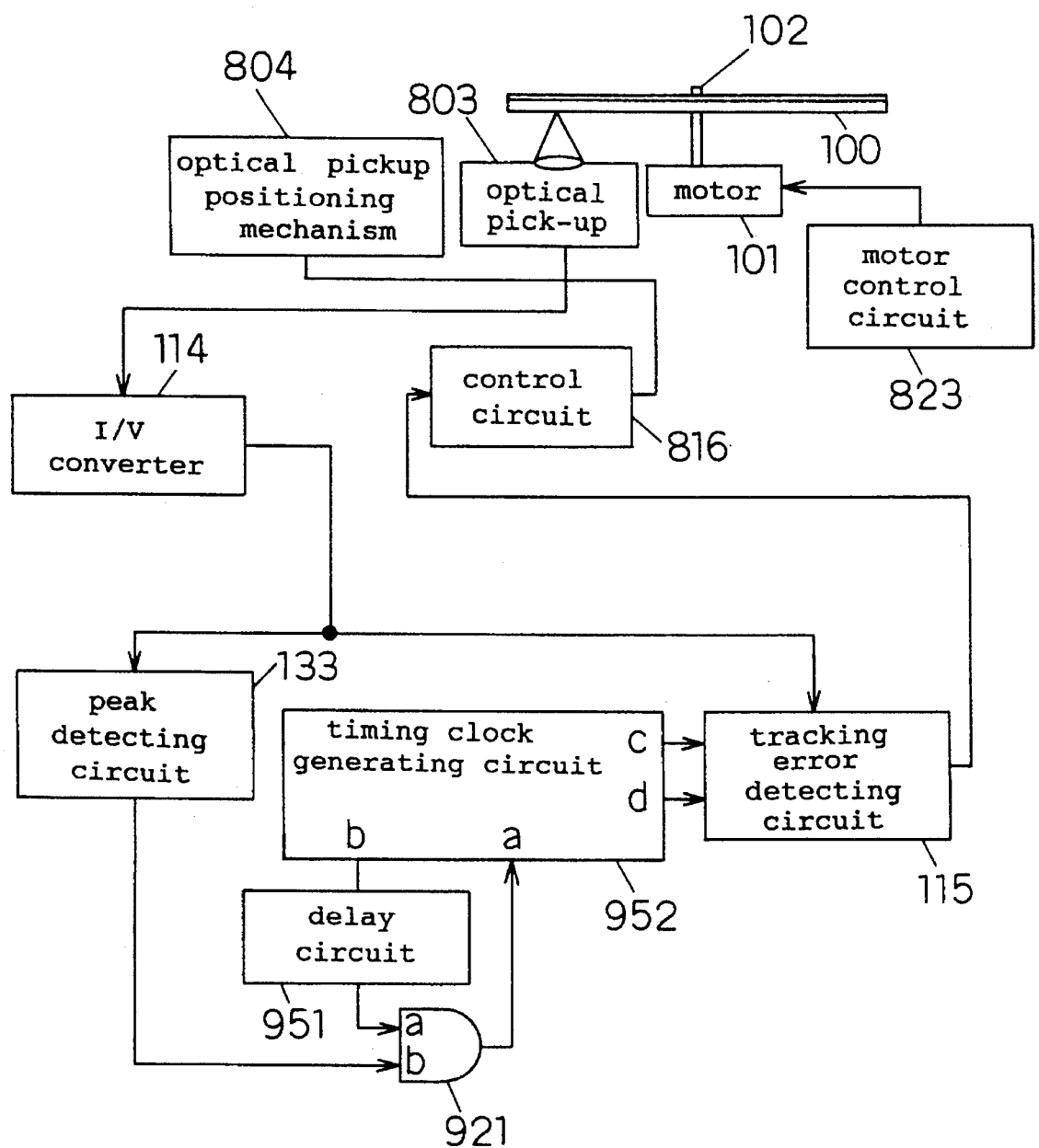
FIG. 32 is a block diagram of an optical disk unit according to a fourth embodiment of the present invention.

A terminal 961 is equivalent to a terminal (a) of the timing clock generating circuit 952 in FIG. 32, a terminal 962 to a terminal (c), a terminal 963 to a terminal (d) and terminal 964 to a terminal (b), respectively. The same reference numerals are designated to the same blocks with those in the timing clock generating circuit 920 in the third embodiment (whose block diagram is shown in FIG. 30). What is different from the third embodiment is that a delay circuit 960 is added. The delay circuit 960 outputs by delaying an input signal by time D. Accordingly, a PLL circuit 965 generates a clock signal having a phase which is in advance of a clock mark signal input to the terminal 961 by time D and whose frequency is 22 times of that.

Figure 34:
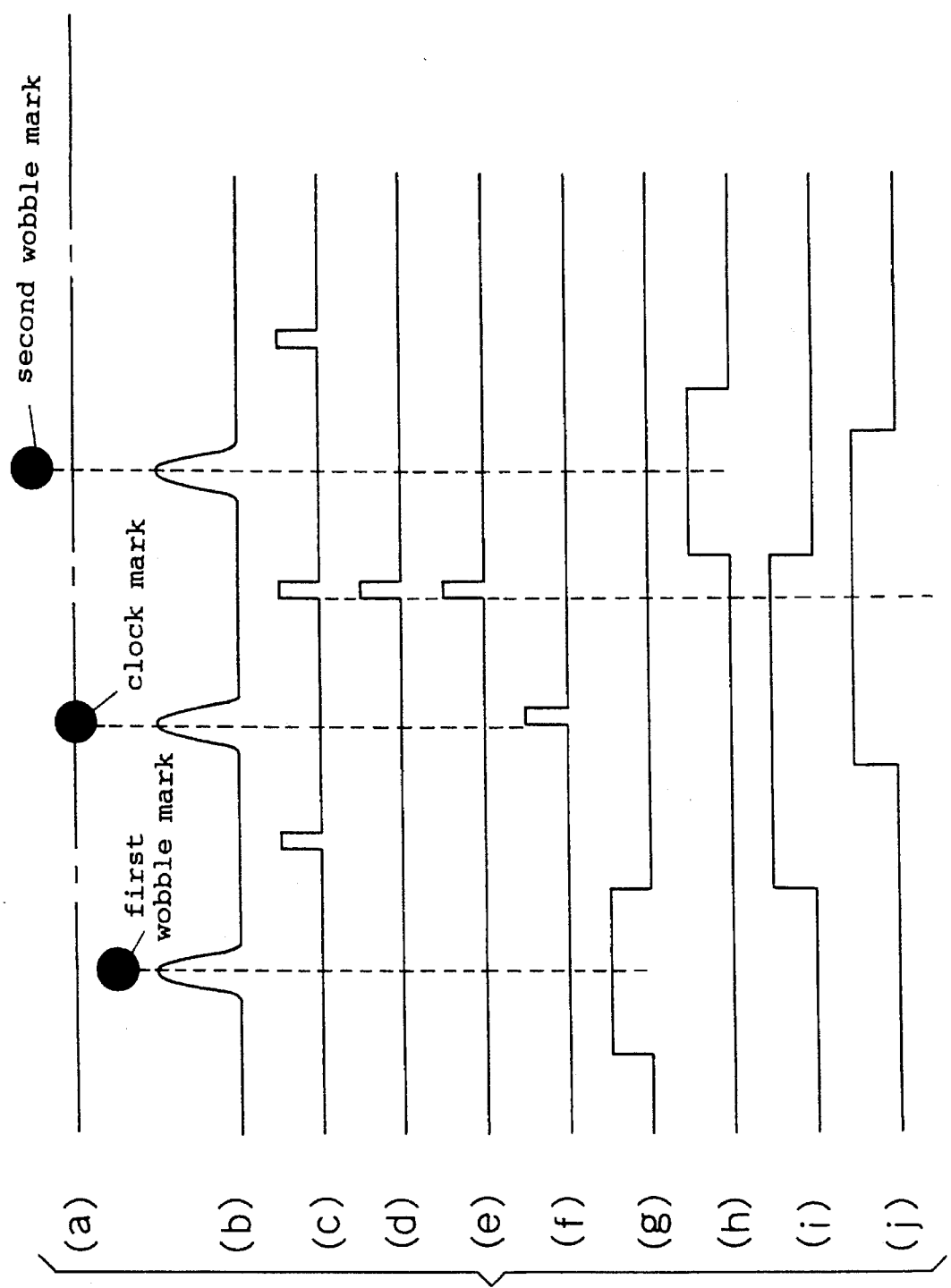
FIG. 34 is a waveform chart for explaining operations of the optical disk drive apparatus of the fourth embodiment.

The operation of the optical disk drive apparatus shown in FIG. 32 will be explained using FIG. 34.

FIG. 34(a) is a diagram typically showing the array of the marks on the disk shown in FIG. 1. A waveform (b) represents the output of the I/V converter 114, a waveform (c) the output of the peak detecting circuit 133, a waveform (d) the clock mark signal which is the output of an AND gate 921, a waveform (e) the output waveform of the delay circuit 960 of the timing clock generating circuit 952 shown in FIG. 33, a waveform (f) a dividing pulse of a frequency divider 925 of the timing clock generating circuit 952 shown in FIG. 33, a waveform (g) the output signal at the terminal (c) of the timing clock generating circuit 952 which is the gate signal for detecting the first wobble mark, a waveform (h) the output signal at the terminal (d) of the timing clock generating circuit 952 which is the gate signal for detecting the second wobble mark and a waveform (i) the output waveform at a terminal (b) of the timing clock generating circuit 952 which is a gate signal for detecting clock mark, respectively.

Assume that a leading edge of a peak detection signal deviates from a center of a mark because a processing speed of the peak detecting circuit 133 is slow similarly to the third embodiment. A waveform (c) shows a case when it is delayed by time D. In this case, a clock mark signal which is delayed by time D from a clock mark as shown by the waveform (d) is input to a terminal (a) of the timing clock generating circuit 952 via the AND gate 921. The PLL circuit 965 operates so that the delayed dividing pulse output by the delay circuit 960 of the timing clock generating circuit 952 is synchronized with the clock mark signal shown in the waveform (d). Then the pulse output by the delay circuit 960 and the clock mark signal are synchronized as shown by the waveforms (d) and (e). The input signal of the delay circuit 960 which is the dividing pulse becomes a signal in advance of the clock mark signal by time D. In this state, the dividing pulse coincides with the center of clock mark as shown in the waveform (f). Accordingly, the clock signal oscillated by the VCO 610 of the timing clock generating circuit 952 shown in FIG. 33 is synchronized with the center of the marks. That is, the clock signal oscillated by the VCO 610 becomes the reference clock signal. Accordingly, the gate signal for detecting the first wobble mark shown by the waveform (g) becomes high level at the first wobble mark. Further, the gate signal for detecting the second wobble mark becomes high level at the second wobble mark. However, the gate signal for detecting clock mark shown by the waveform (i) advances by time D from the clock mark detecting signal. Then it is delayed by the delay circuit 951 by time D and is sent to the AND gate 921. Thereby a pulse which accurately corresponds to a clock mark can be sampled from the peak detection signal.

While each preferred embodiment of the present invention has been explained above, the present invention is not confined to the embodiments. Also the array of the wobble marks and clock marks is not confined to those exemplified in the embodiments and they can be used in the same manner even if the order is switched by modifying the circuit construction accordingly as a matter of course.

Further, although the marks have been formed in synchronization on positions where one block has been divided into 22 equal parts and one track has been composed of 1000 blocks in the embodiments, they are not confined only to those exemplified and can be used in the same manner even if the number of division and the number of blocks are changed by constructing the circuit accordingly.

Further, it is needless to say that the tracks may De created not only in spiral but also cocentrically.

Further, the present invention may be used not only for a read only optical recording medium having a reflection film of aluminum and others Out also for a recordable-readable optical recording medium as a matter of course. Further, either a phase change type recording medium or magneto-optic recording medium may be used among recordable media.

Further, the present invention may be practiced in the same manner in an unit for recording or reproducing information using magnetism such as a magnetic disk drive apparatus.

What is claimed is:

1. A reference clock signal generator for A sampled servo type disk drive apparatus, the reference clock signal generator for generating a references clock signal as a reference for reproducing or recording information by a PLL (phase locked loop) circuit based on clock mark signals obtained by detecting clock marks from a disc, during reproduction or recording of information, the disk having unique distance marks, the reference clock signal generator comprising:

a VCO for generating a reference clock signal;

frequency dividing means for dividing the clock signal output by said VCO by counting the clock signal;

clock mark detecting means for detecting the clock marks based on a count from said frequency dividing means;

clock oscillating means for generating clock signals;

switching means for selecting an output signal of said clock mark detecting means and an output signal of said clock oscillating means to produce a switch outputs;

phase comparing means for comparing phases of the switch output signal of said switching means and the output signal of said frequency dividing means and for providing a result of the comparison to said VCO;

unique distance detecting means for detecting a unique distance which is a time interval between the unique distance marks based on said reference clock signal output by said VCO; and reference mark detecting means for detecting predetermined marks based on an output signal of said unique distance detecting means;

said switching means selecting said clock signals of said clock oscillating means as the switch output signal and said switching means also for setting a dividing ratio of said frequency dividing means so that an oscillation frequency of said VCO becomes equal to a frequency of said reference clock signal;

said switching means selecting the output signal of said clock mark detecting means when said unique distance detecting means detects the unique distance; and wherein a count of said frequency dividing means is preset at a predetermined value corresponding to an output signal of said reference mark detecting means after setting said dividing ratio of-said frequency dividing means so that the oscillation frequency of said VCO becomes equal to the frequency of the reference clock signal, and a desired reference clock is obtained from said VCO.

2. The reference clock signal generator for the sampled servo type disk drive apparatus according to claim 1, wherein said clock oscillating means generates clock signals which correspond to a number of rotations of the disk.

3. The reference clock signal generator for the sampled servo type disk drive apparatus according to claim 1, wherein said reference mark detecting means is also for marking the predetermined mark as the clock mark immediately after the detection of said unique distance.

4. The reference clock signal generator for sampled servo type disk drive apparatus according to claim 2, wherein said reference mark detecting means is also for marking the predetermined mark as the clock mark immediately after the detection of said unique distance.

5. A reference clock signal generator for a sampled servo type disk drive apparatus for generating a reference clock signal as a reference for reproducing or recording information by a PLL (phase locked loop) circuit based on clock mark signals obtained by detecting clock marks from a disc, during reproduction or recording of information, where the disc has marks, the reference clock signal generator comprising:

mark detecting means for outputting pulses obtained by detecting marks on the disk;

a VCO for generating the reference clock signal;

frequency dividing means for dividing the clock signal output by said VCO by counting the reference clock signal;

clock mark gate generating means for generating a gate signal for detecting the clock marks based on the count from said frequency dividing means;

clock mark detecting means for detecting the pulses which correspond to the clock marks from the pulses of said mark detecting means based on an output signal from said clock mark gate generating means;

phase comparing means for comparing phases of the output signal of said clock mark detecting means and the output signal of said frequency dividing means and for providing a result of the comparison to said VCO;

pulse counting means for detecting a number of the pulses output by said mark detecting means during a gate period to produce a count;

noise detecting means for detecting when the count of said pules counting means is other than 1 and for producing a result; and control means for stopping an operation of said phase comparing means in response to the result of said noise detecting means.

6. A reference clock signal generator for a sampled servo type disk drive apparatus for generating a reference clock signal as a reference for reproducing or recording information by a PLL (phase locked loop) circuit based on clock mark signals obtained by detecting clock marks from a disc, during production or recording of information, where the disc has marks, the reference clock signal generator comprising;

mark detecting means for detecting the marks on the disk and outputting pulses in response to said marks on the disk;

a VCO for generating the reference clock signal;

frequency dividing means for dividing the clock signal output by said VCO by counting the reference clock signal;

clock mark gate generating means for generating a gate signal for detecting the clock marks based on the count from said frequency dividing means;

clock mark detecting means for detecting the pulses which correspond to the clock marks from the pulses of said mark detecting means based on an output signal from said clock mark gate generating means;

phase comparing means for comparing phases of the output signal of said clock mark detecting means and the output signal of said frequency dividing means and providing a result of the comparison to said VCO; and memory means for storing a control voltage of said VCO during a period when the disk rotates once and for adding the stored value to the control voltage of said VCO.

7. A reference clock signal generator for a sampled Servo type disk drive apparatus for generating a reference clock signal as a reference for reproducing or recording information by a PLL (phase locked loop) circuit based on clock mark signals obtained by detecting clock marks from a disk, during reproduction or recording of information, where the disc has marks, the reference clock signal generator comprising:

mark detecting means for producing pulses in response to the marks on the disk;

a VCO for generating the reference clock signal;

frequency dividing means for dividing the clock signal output by said VCO by counting the reference clock signal;

clock mark gate generating means for generating a gate signal for detecting the clock marks based on the count from said frequency dividing means;

clock mark detecting means for detecting the pulses which correspond to the clock marks from the pulses of said mark detecting means based on an output signal from said clock mark gate generating means;

phase comparing means for comparing phases of the output signal of said clock mark detecting means and the output signal of said frequency dividing means and for providing a result of the comparison to said VCO;

memory means for storing a control voltage of said VCO during a period when the disk rotates once and for adding the stored value to the control voltage of said VCO;

pulse counting means for detecting a number of the pulses from said mark detecting means during a gate period;

noise detecting means for detecting when the count of said pulse counting means is other then 1 and producing a result; and control means for stopping an operation of said phase comparing means in response to the result of said noise detecting means.

8. The reference clock signal generator for the sampled servo type disk drive apparatus according to claim 6, wherein said memory means is also for storing at an address a value of the control voltage of said VCO which has passed through a low pass filter and for shifting the address where the value has been stored.

9. The reference clock signal generator for sampled servo type disk drive apparatus according to claim 7, wherein said memory means is also for storing at an address a value of the control voltage of said VCO which has passed through a low pass filter and for shifting the address where the value has been stored.

10. The reference clock signal generator for sampled servo type disk drive apparatus according to claim 7, wherein said memory means is also for storing the control voltage of said VCO when the count of said pulse counting means is 1 during a period when the disk rotates once.

11. A disk unit for reproducing or recording information using a disk having tracks on which clock marks and wobble marks are periodically recorded and information is recorded, comprising:

a VCO for generating a clock signal;

frequency dividing means for dividing the clock signal from said VCO by counting the clock signal and for producing a count;

clock mark detecting means for detecting the clock marks based on the count from said frequency dividing means;

phase comparing means for comparing phases of the output signal of said clock mark detecting means and the output signal of said frequency dividing means and for providing a result of the comparison to said VCO;

wobble mark gate generating means for generating gate signals for detecting wobble marks based on the count of said frequency dividing means;

signal detecting means for detecting the information recorded on the disk;

delay means for delaying the output signal of said signal detecting means by a time which corresponds to a processing time of said mark detecting means; and track deviation detecting means for detecting a deviation between a position from which the information is reproduced and a center of a track using the output signal of said delay means and the output signal of said wobble mark gate generating means.

12. A disk unit for reproducing or recording information using a disk having tracks on which clock marks and wobble marks are periodically recorded and information is recorded, comprising:

a VCO for generating a clock signal;

frequency dividing means for dividing the clock signal from said VCO by counting the clock signal;

clock mark gate generating means for generating a gate signal for detecting clock marks based on the count from said frequency dividing means;

signal detecting means for detecting the information recorded on the disk;

mark detecting means for outputting pulses in response to marks detected on the disk based on the output signal of said signal detecting means;

first delay means for delaying the output signal of said clock mark gate generating means by a time which corresponds to a processing time of said mark detecting means;

clock mark detecting means for detecting the pulses from the pulses which correspond to the clock marks from said mark detecting means based on an output signal from said first delay means;

second delay means for delaying the output signal of said frequency dividing means by the time which corresponds to the processing time of said mark detecting means;

phase comparing means for comparing phases of the output signal of said clock mark detecting means and the output signal of said second delay means and for providing a result of the comparison to said VCO;

wobble mark gate generating means for generating gate signals for detecting wobble marks based on the count from said frequency dividing means; and track deviation detecting means for detecting a deviation between a position from which the information is reproduced and the center of a track using the output signals of said signal detecting means and said wobble mark gate generating means.

* * * * *

UNITED STATES PATENT AND TRADE MARK OFFICE
CERTIFICATE OF CORRECTION

PATENT NO. : 5,526,332
DATED : June 11, 1996
INVENTOR(S) : Yamada et al.

It is certified that error appears in the above-identified patent and that said Letters Patent is hereby corrected as shown below:

Column 27, line 46, the second occurrence of "A" should be --a--.

Column 27, line 48, "references" should be --reference--.

Column 27, lines 64-65, "outputs" should be --output signal--.

Column 28, line 22, delete the hyphen "-" between "of" and "said".

Column 29, line 15, "production" should be --reproduction--.

Column 29, line 42, "Servo" should be --servo--.

Signed and Sealed this

Seventeenth Day of December, 1996

*Attest:*

BRUCE LEHMAN

*Attesting Officer*     Commissioner of Patents and Trademarks